(12) United States Patent
Matsuda et al.

(10) Patent No.: US 7,428,740 B2
(45) Date of Patent: Sep. 23, 2008

(54) RECORDING MEDIUM DRIVE APPARATUS AND ELECTRONIC EQUIPMENT INCLUDING THE RECORDING MEDIUM DRIVE APPARATUS

(75) Inventors: Mikinori Matsuda, Kanagawa (JP); Kazuhito Kurita, Kanagawa (JP); Tadami Nakamura, Saitama (JP); Takahiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 394 days.

(21) Appl. No.: 11/313,149

(22) Filed: Dec. 20, 2005

(65) Prior Publication Data

US 2006/0143632 A1 Jun. 29, 2006

(30) Foreign Application Priority Data

Dec. 24, 2004 (JP) ............................. 2004-372973

(51) Int. Cl.
*G11B 17/04* (2006.01)
(52) U.S. Cl. ...................................... 720/638
(58) Field of Classification Search .......... 720/637–638
See application file for complete search history.

(56) References Cited

U.S. PATENT DOCUMENTS 5,784,351 A * 7/1998 Takagi ........................ 720/647

2006/0143632 A1 * 6/2006 Matsuda et al. ............. 720/638

* cited by examiner

*Primary Examiner*—Joseph Feild
*Assistant Examiner*—Mark Blouin
(74) *Attorney, Agent, or Firm*—Wolf, Greenfield & Sacks, P.C.

(57) ABSTRACT

Disclosed herein is a recording medium drive apparatus adapted to use a recording medium cartridge. The recording medium drive apparatus includes a holder for holding the recording medium cartridge inserted, an eject lever supported to one of a pair of side plate portions of the holder so as to be movable in an inserting direction and ejecting direction of the recording medium cartridge with respect to the holder, and a biasing spring for biasing the eject lever in the ejecting direction. The eject lever has a supported portion supported to the one side plate portion of the holder and an engaging projection projecting from the supported portion toward the other side plate portion of the holder. When the recording medium cartridge is inserted into the holder, the engaging projection is inserted into an engagement groove of the recording medium cartridge and engaged with an engaging portion formed in the engagement groove. When the eject lever is moved in the ejecting direction by a biasing force of the biasing spring in the condition where the engaging projection is engaged with the engaging portion of the recording medium cartridge, the recording medium cartridge is ejected from the holder.

5 Claims, 24 Drawing Sheets

RECORDING MEDIUM DRIVE APPARATUS AND ELECTRONIC EQUIPMENT INCLUDING THE RECORDING MEDIUM DRIVE APPARATUS

CROSS REFERENCES TO RELATED APPLICATIONS

The present invention contains subject matter related to Japanese Patent Application 2004-372973 filed with the Japanese Patent Office on Dec. 24, 2004, the entire contents of which being incorporated herein by reference.

BACKGROUND OF THE INVENTION

The present invention relates to a recording medium drive apparatus and electronic equipment including the recording medium drive apparatus, and more particularly to a recording medium drive apparatus and electronic equipment which can be reduced in size and can be improved in reliability of an eject operation of a recording medium cartridge from a holder by using an eject lever movable in an inserting direction and an ejecting direction of the recording medium cartridge with respect to the holder.

Known is a recording medium cartridge including a case and a recording medium such as a disk-shaped recording medium rotatably accommodated in the case, and also known is a recording medium drive apparatus for recording and/or reproducing an information signal on the recording medium of the recording medium cartridge mentioned above.

The recording medium drive apparatus includes a holder for holding the recording medium cartridge inserted therein. In the condition where the recording medium cartridge is inserted and held in the holder, an information signal is recorded or reproduced on the recording medium.

In the recording medium drive apparatus of such a type that the recording medium cartridge is inserted into the holder, the recording medium cartridge is ejected from the holder by an eject lever after ending the recording or reproduction of an information signal on the recording medium.

In a recording medium drive apparatus in related art, an eject lever is pivotably supported to a chassis or a holder and is biased in one of opposite pivotal directions by a spring member. When the eject lever is pivotally moved in the one pivotal direction by a biasing force of the spring member, the eject lever operates to push the front end of the case of the recording medium cartridge to thereby eject the recording medium cartridge from the holder (see Japanese Patent Laid-open No. 2001-176222, for example).

SUMMARY OF THE INVENTION

In recent years, the recording medium cartridge developed includes not only a type having a flat, substantially rectangular case, but also a type having a flat case composed of a semicircular portion as a substantially front half portion in the inserting direction of the recording medium cartridge into the holder and a substantially rectangular portion as the remaining rear half portion.

In a recording medium drive apparatus adapted to use such a recording medium cartridge having a semicircular front half portion, however, the following problems arise in the case of using an eject lever similar to that mentioned in the above publication (see FIGS. 24 and 25).

As shown in FIG. 24, an eject lever a is generally located in a lateral end portion (right or left end portion) of a chassis (or holder) b from the viewpoint of efficient use of the installation space for the eject lever. When a recording medium cartridge c is depressed by the eject lever a, a depression point Q on the recording medium cartridge c deviates from a laterally central line M toward the right or left. Accordingly, a depression force F from the eject lever a is applied in a direction P perpendicular to a tangential line S at the depression point Q. Accordingly, the direction of a vector representing the depression force F does not coincide with an ejecting direction A of the recording medium cartridge c from the holder b, so that the ejection of the recording medium cartridge c may not be smoothly performed. Furthermore, the depression force F causes a force of depressing one of opposite side plate portions of the holder b by the recording medium cartridge c, so that the recording medium cartridge c may come into sliding contact with this one side plate portion of the holder b, causing damage to the recording medium cartridge.

To cope with this problem, the eject lever a may be increased in length so that the depression point Q lies on the laterally central line M as shown in FIG. 25. In this case, however, the installation space for the eject lever a is increased, causing an increase in size of the recording medium drive apparatus.

It is desirable to provide a recording medium drive apparatus which can be reduced in size and can be improved in reliability of the eject operation of the recording medium cartridge from the holder.

It is also desirable to provide electronic equipment including the recording medium drive apparatus.

According to an embodiment of the present invention, a recording medium drive apparatus is adapted to use a recording medium cartridge having a case and a recording medium accommodated in the case, the case having a substantially arcuate circumferential surface and a pair of straight side surfaces respectively contiguous to the opposite ends of the arcuate circumferential surface, at least one of the side surfaces being formed with an engagement groove at a position near the arcuate circumferential surface, the engagement groove including an engaging portion. The recording medium drive apparatus includes a holder for holding the recording medium cartridge inserted, the holder having a pair of side plate portions respectively extending along the side surfaces of the recording medium cartridge; a recording/reproducing system for recording and/or reproducing an information signal on the recording medium; a chassis for mounting the recording/reproducing system; an eject lever supported to one of the side plate portions of the holder so as to be movable in an inserting direction of the recording medium cartridge into the holder and in an ejecting direction of the recording medium cartridge from the holder opposite to the inserting direction, the eject lever having a supported portion supported to the one side plate portion of the holder and an engaging projection projecting from the supported portion toward the other side plate portion of the holder, the engaging projection being inserted into the engagement groove of the recording medium cartridge and engaged with the engaging portion in the engagement groove when the recording medium cartridge is inserted into the holder; and a biasing spring for biasing the eject lever in the ejecting direction.

Thus, the recording medium cartridge is ejected by the eject lever supported to one of the side plate portions of the holder so as to be movable in the inserting direction and the ejecting direction of the recording medium cartridge with respect to the holder and biased in the ejecting direction by the biasing spring. Accordingly, the eject operation of the recording medium cartridge can be performed smoothly.

Further, the mechanism for performing the eject operation is compact, so that the installation space therefor can be reduced to thereby allow a size reduction of the recording medium drive apparatus.

According to an embodiment of the present invention, electronic equipment includes a housing having a front surface and a rear surface; a display provided on the front surface of the housing; a lid openably provided on the rear surface of the housing; and a recording medium drive apparatus mounted in the housing and adapted to use a recording medium cartridge having a case and a recording medium accommodated in the case, the case having a substantially arcuate circumferential surface and a pair of straight side surfaces respectively contiguous to the opposite ends of the arcuate circumferential surface, at least one of the side surfaces being formed with an engagement groove at a position near the arcuate circumferential surface, the engagement groove including an engaging portion, the recording medium drive apparatus comprising a holder pivotably provided in the housing for holding the recording medium cartridge inserted, the holder having a pair of side plate portions respectively extending along the side surfaces of the recording medium cartridge; a recording/reproducing system for recording and/or reproducing an information signal on the recording medium; a chassis for mounting the recording/reproducing system; an eject lever supported to one of the side plate portions of the holder so as to be movable in an inserting direction of the recording medium cartridge into the holder and in an ejecting direction of the recording medium cartridge from the holder opposite to the inserting direction, the eject lever having a supported portion supported to the one side plate portion of the holder and an engaging projection projecting from the supported portion toward the other side plate portion of the holder, the engaging projection being inserted into the engagement groove of the recording medium cartridge and engaged with the engaging portion in the engagement groove when the recording medium cartridge is inserted into the holder; and a biasing spring for biasing the eject lever in the ejecting direction.

Thus, the recording medium cartridge is ejected by the eject lever supported to one of the side plate portions of the holder so as to be movable in the inserting direction and the ejecting direction of the recording medium cartridge with respect to the holder and biased in the ejecting direction by the biasing spring. Accordingly, the eject operation of the recording medium cartridge can be performed smoothly.

Further, the mechanism for performing the eject operation is compact, so that the installation space therefore can be reduced to thereby allow a size reduction of the electronic equipment.

BRIEF DESCRIPTION OF THE DRAWINGS

These and other objects of the invention will be seen by reference to the description, taken in connection with the accompanying drawings, in which.

DETAILED DESCRIPTION OF THE PREFERRED EMBODIMENTS

There will now be described a preferred embodiment of the recording medium drive apparatus and the electronic equipment including it according to the present invention with reference to the drawings. In the following preferred embodiment, the electronic equipment according to the present invention is applied to a portable game machine, and the recording medium drive apparatus according to the present invention is applied to a recording medium drive apparatus included in this portable game machine.

The applicability of the present invention is not limited to a portable game machine and a recording medium drive apparatus included in the portable game machine, but the electronic equipment according to the present invention is widely applicable to various electronic equipment handling a recording medium, e.g., an information processing device such as a personal computer, a communication device such as a telephone and facsimile, an information terminal device such as PDA (Personal Digital Assistant), an imaging device such as a still camera, electronic camera, and video camera, audiovisual equipment such as television and radio, and recording equipment/audio equipment handling various recording media such as a disk-shaped recording medium and a tape cassette. Further, the recording medium drive apparatus according to the present invention is widely applicable to any recording medium drive apparatus for recording and/or reproducing an information signal on a recording medium adapted to be handled in such various electronic equipment.

Figure 1:
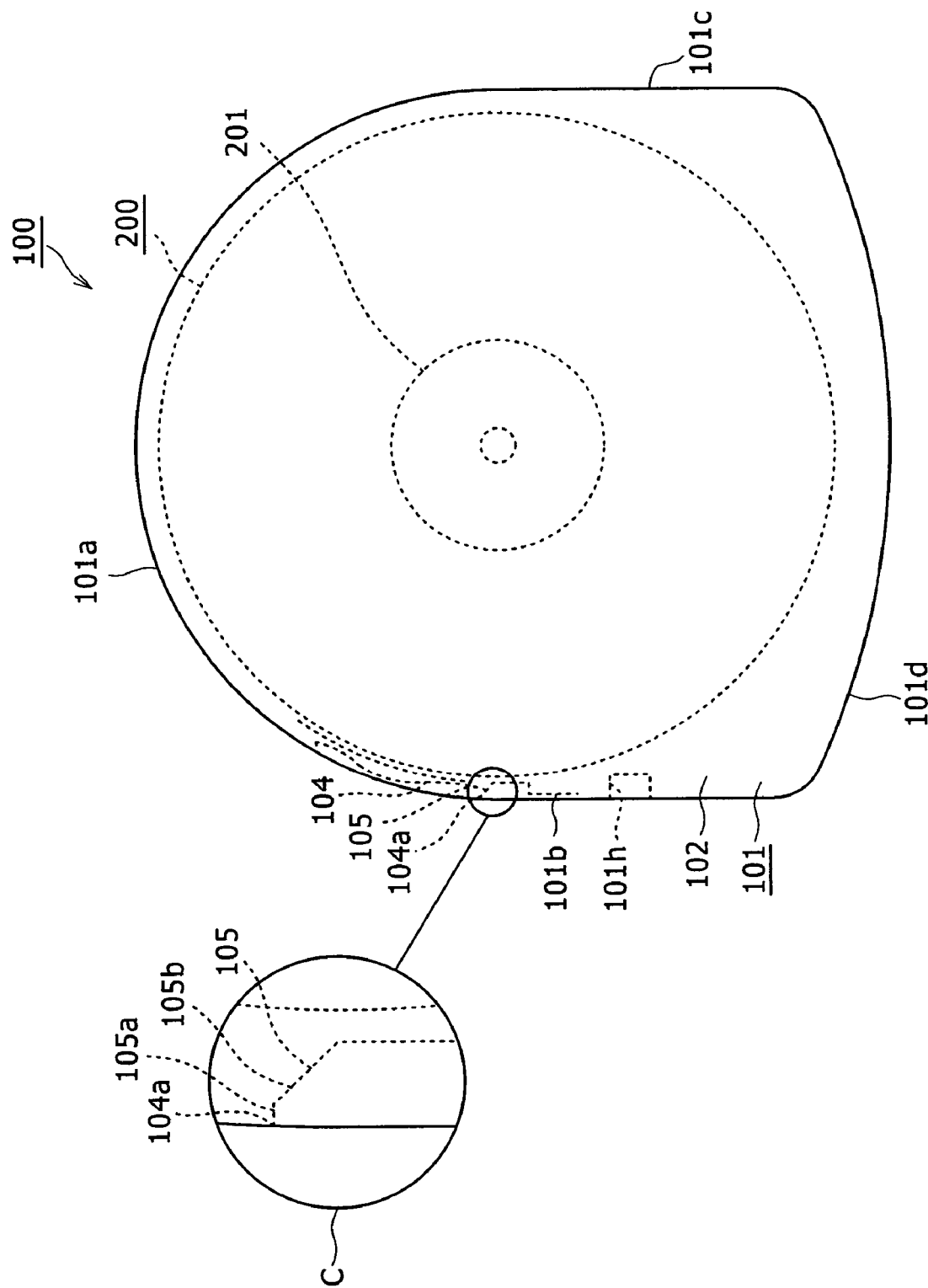
FIG. 1 is an enlarged plan view of a recording medium cartridge usable according to an embodiment of the present invention.
Figure 2:
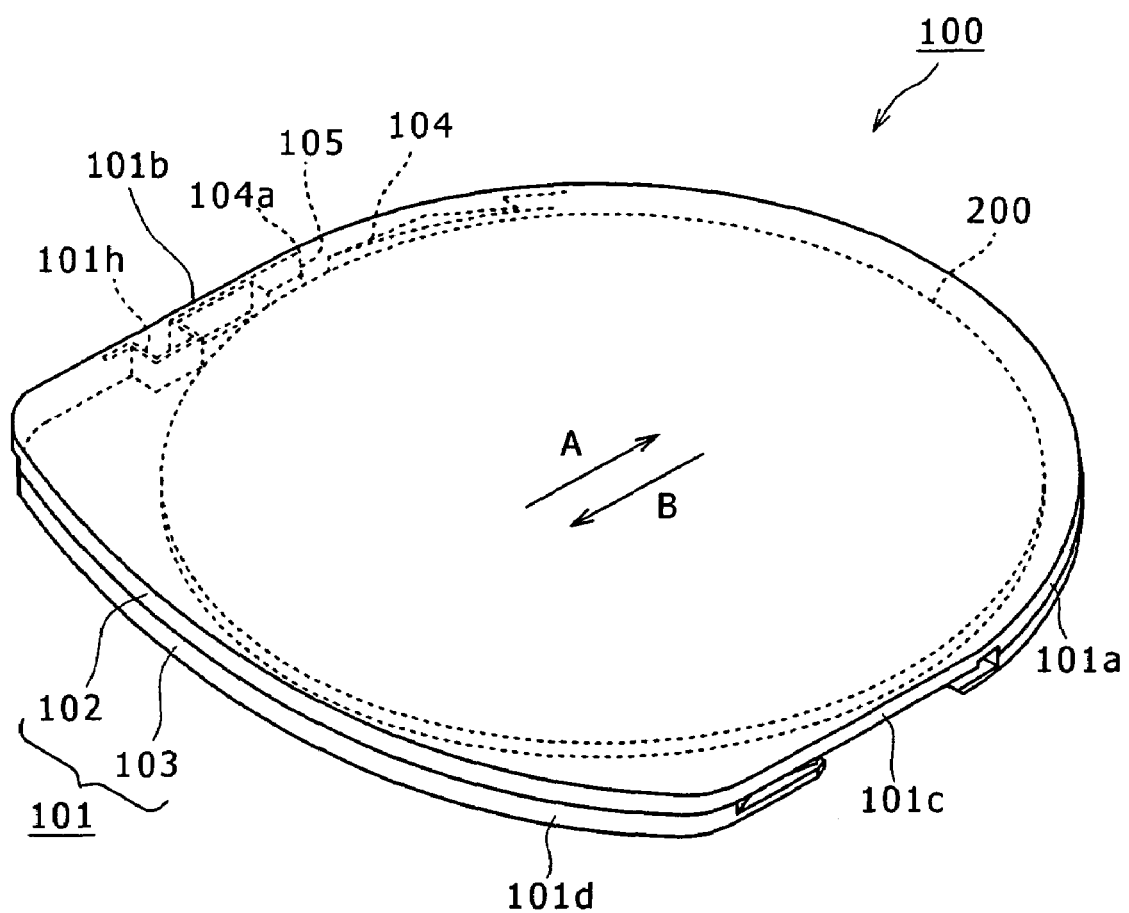
FIG. 2 is an enlarged perspective view of the recording medium cartridge as viewed from the upper side thereof.
Figure 3:
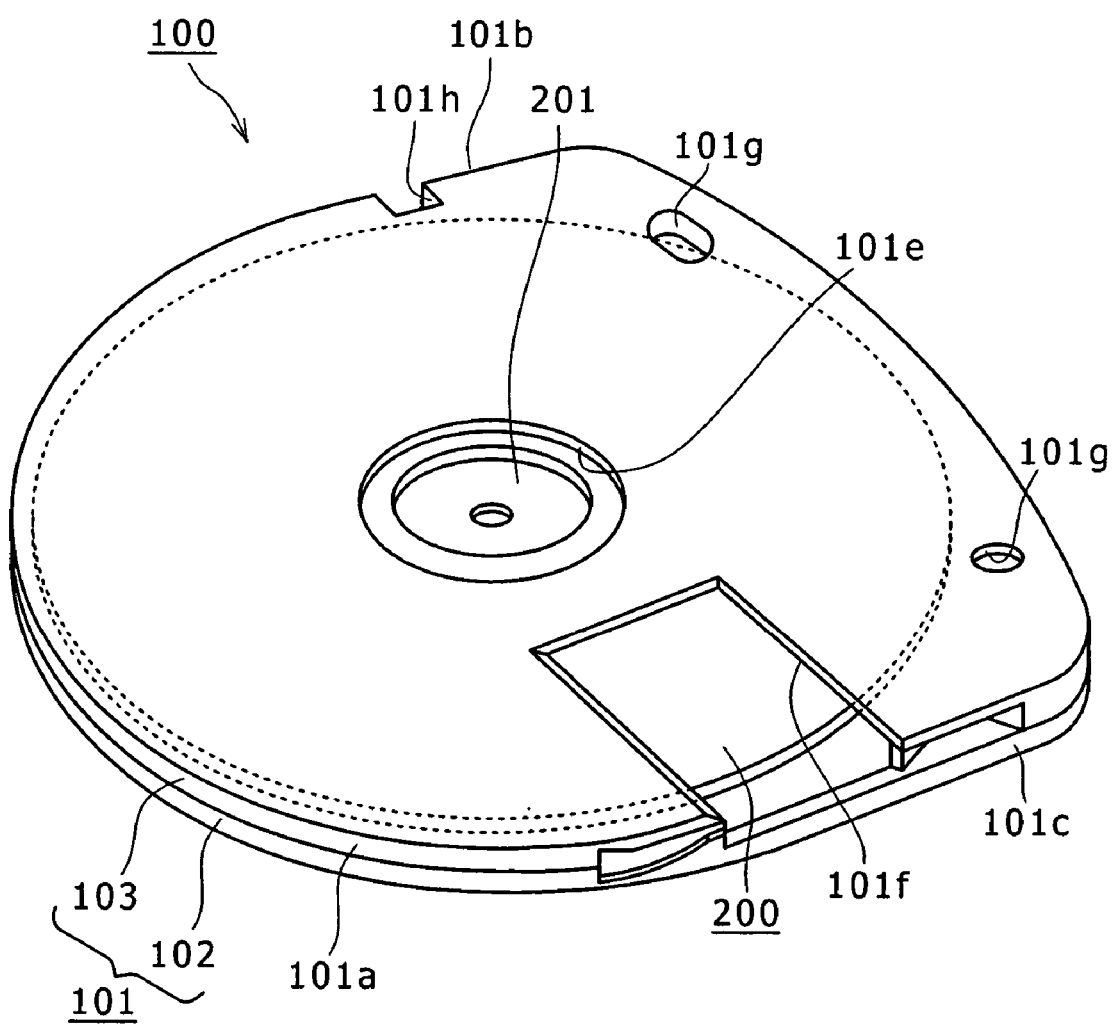
FIG. 3 is an enlarged perspective view of the recording medium cartridge as viewed from the lower side thereof.

Referring now to FIGS. 1 to 3, there is shown a recording medium cartridge 100.

The recording medium cartridge 100 is composed generally of a flat case 101 and a recording medium 200 rotatably accommodated in the flat case 101.

The case 101 is composed of an upper shell 102 and a lower shell 103 connected to each other (see FIGS. 2 and 3). The case 101 has such a shape that a front half portion thereof in its inserting direction (the direction shown by an arrow A in FIG. 2) with respect to a holder to be hereinafter described is substantially semicircular and has an arcuate circumferential surface 101a and that the remaining rear half portion of the case 101 in its ejecting direction (the direction shown by an arrow B in FIG. 2) opposite to the above inserting direction is laterally elongated as viewed in FIG. 1 and has a pair of parallel side surfaces 101b and 101c respectively contiguous to the opposite ends of the arcuate surface 101a and extending linearly in the above inserting direction. Further, the side surfaces 101b and 101c are connected at their ends in the above ejecting direction by a gently convex circumferential surface 101d.

An engagement groove 104 is formed at a portion ranging from the arcuate surface 101a to the left side surface 101b of the case 101 (see FIGS. 1 and 2). The engagement groove 104 has an opening edge 104a on the side surface 101b side at a substantially contiguous position between the arcuate surface 101a and the side surface 101b.

The engagement groove 104 further has an engaging portion 105 contiguous to the opening edge 104a (see an encircled portion C in FIG. 1). The engaging portion 105 has a laterally extending flat surface 105a contiguous to the opening edge 104a and oriented in the above inserting direction and an inclined surface 105b contiguous to the flat surface 105a and displaced in the above ejecting direction with a change in position from the flat surface 105a toward the inside of the case 101.

As shown in FIG. 3, the lower shell 103 of the case 101 is formed at its central portion with a table insert hole 101e. The lower shell 103 of the case 101 is further formed with a light pass hole 101f at a portion between the table insert hole 101e and the right side surface 101c, so as to allow the pass of laser light emitted from a light emitting element provided in an optical pickup to be hereinafter described.

The lower shell 103 of the case 101 is further formed with a pair of positioning holes 101g laterally spaced apart from each other in the vicinity of the convex surface 101d.

The left side surface 101b of the case 101 is further formed with an engagement recess 101h at a substantially central position in the above inserting direction. The engagement recess 101h opens to the left side and lower side of the case 101.

A core 201 formed of a magnetic metal material is mounted at a central portion of the recording medium 200 accommodated in the case 101 (see FIG. 3). The core 201 is positioned so as to correspond to the table insert hole 101e of the case 101.

Next, the electronic equipment will be described.

Figure 4:
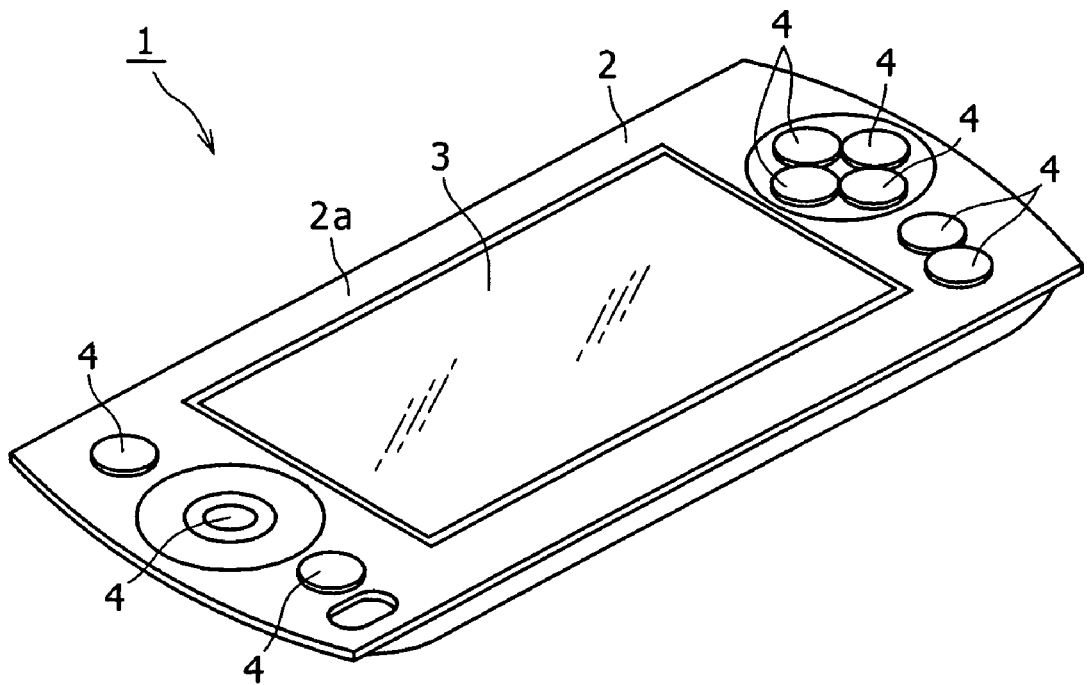
FIG. 4 is a perspective view of electronic equipment according to an embodiment of the present invention as viewed from the front side thereof.
Figure 5:
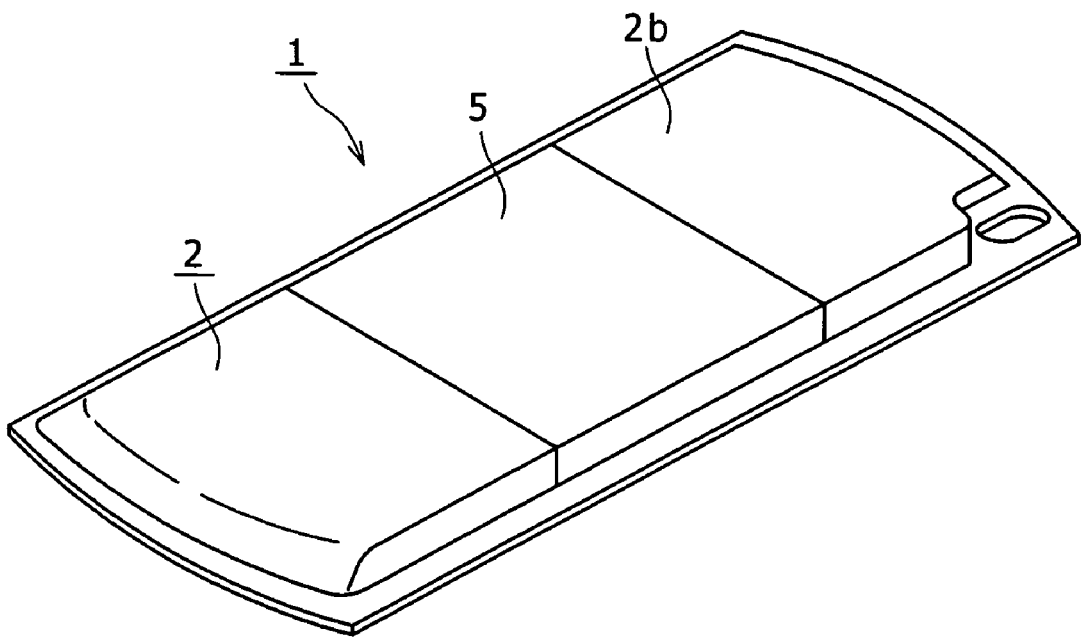
FIG. 5 is a perspective view of the electronic equipment as viewed from the rear side thereof.
Figure 6:
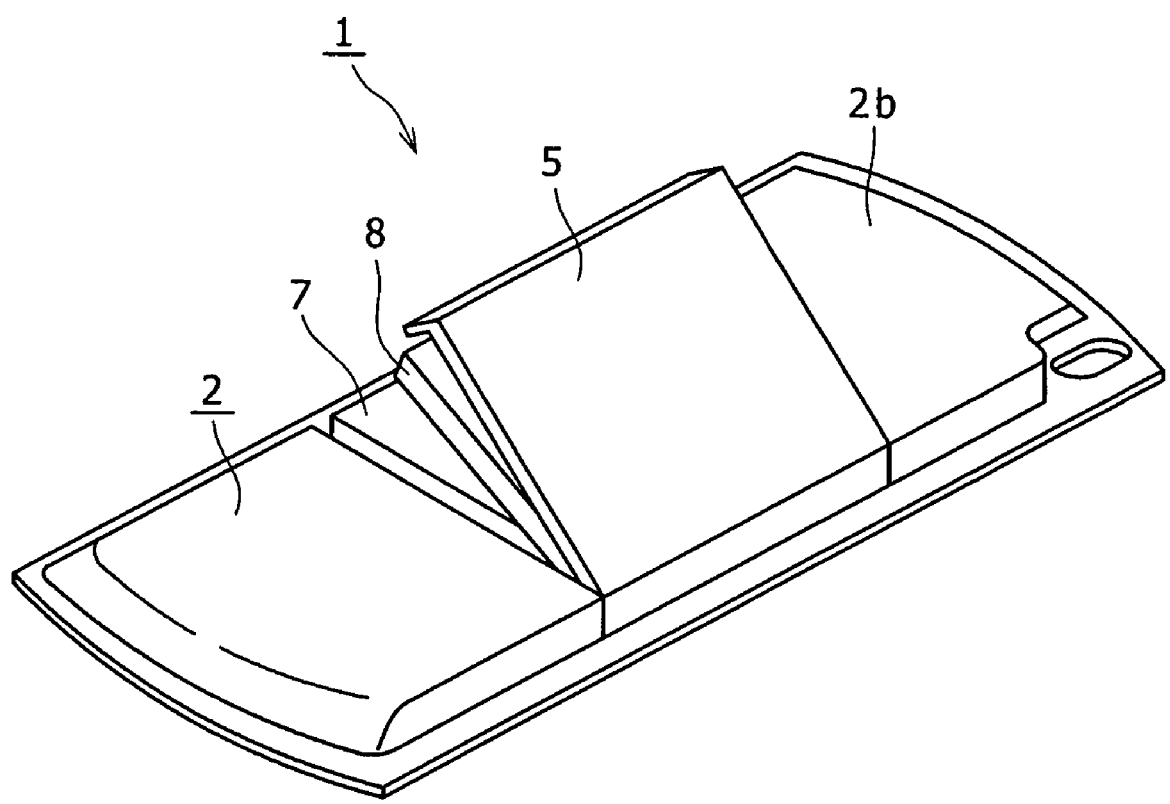
FIG. 6 is a view similar to FIG. 5, showing an open condition of a lid.

Referring next to FIGS. 4 to 6, there is shown electronic equipment 1 according to the present invention. The electronic equipment (game machine) 1 has a flat, laterally elongated shape, for example. The electronic equipment 1 includes a housing 2 having a front surface 2a and a rear surface 2b.

As shown in FIG. 4, a display 3 is provided at a central portion of the front surface 2a of the housing 2, and a plurality of operation buttons 4 are provided at laterally opposite end portions of the front surface 2a. As shown in FIGS. 5 and 6, a lid 5 is openably provided at a laterally central portion of the rear surface 2b of the housing 2. The lid 5 is pivotably supported at its lower end to have a open position shown in FIG. 6 and a closed position shown in FIG. 5. In the closed position, the lid 5 is locked by a locking mechanism (not shown).

Figure 7:
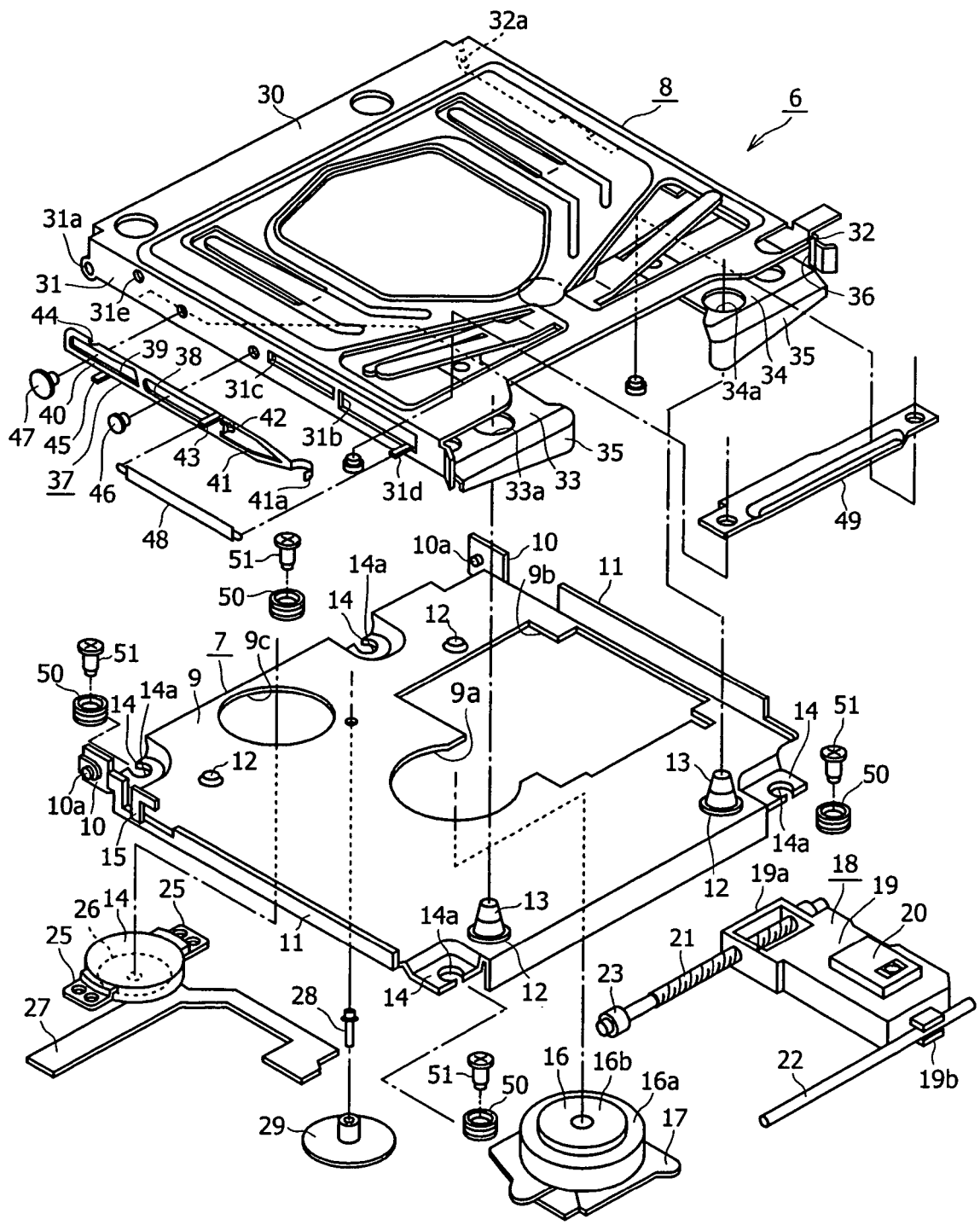
FIG. 7 is an exploded perspective view of a recording medium drive apparatus according to an embodiment of the present invention.
Figure 8:
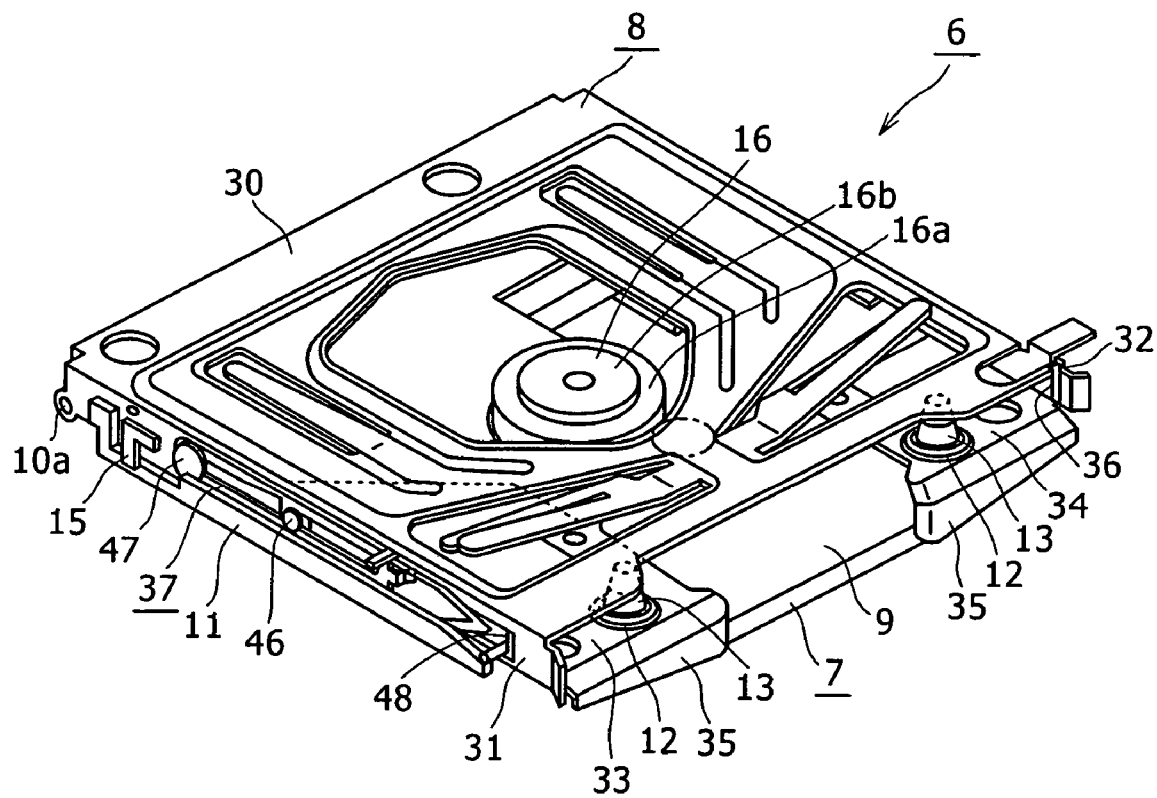
FIG. 8 is a perspective view of the recording medium drive apparatus.

Referring next to FIGS. 7 and 8, there is shown a recording medium drive apparatus 6 according to the present invention. The recording medium drive apparatus 6 is provided in the housing 2 of the electronic equipment 1. The recording medium drive apparatus 6 is composed of a chassis 7, various required components mounted on the chassis 7, a holder 8 pivotably supported to the chassis 7, and various circuits including a drive circuit.

In the following description of the recording medium drive apparatus 6, it is assumed for the convenience of description that the direction of inserting the recording medium cartridge 100 into the holder 8 is the rear side of the drive 6, that the direction of ejecting the recording medium cartridge 100 from the holder 8 is the front side of the drive 6, that the holder 8 is on the upper side of the drive 6, and that the chassis 7 is on the lower side of the drive 6.

The chassis 7 is an integral member formed of a sheet metal material, for example. The chassis 7 has a substantially square base portion 9, a pair of support projections 10 projecting upward from the right and left side edges of the base portion 9 at its rear end, and a pair of side plate portions 11 projecting upward from the right and left side edges of the base portion 9 at its intermediate portion except the front and rear ends. Each support projection 10 is provided with a support shaft (pivot pin) 10a projecting sideward.

A table location hole 9a is formed at a central position of the base portion 9, and a pickup location hole 9b is formed at a position on the right side of the table location hole 9a so as to be continuous thereto. Further, a motor location hole 9c is formed at a rear position of the base portion 9.

Four support pads 12 are provided on the base portion 9 at front and rear spaced positions, and a pair of positioning pins 13 are provided on the front two support pads 12. The outer diameter of each positioning pin 13 is smaller than the outer diameter of each front support pad 12.

Four damper mounting portions 14 are formed at substantially corner positions of the base portion 9. Each damper mounting portion 14 is formed with a mounting recess 14a opening to the front side or rear side of the chassis 7.

Figure 9:
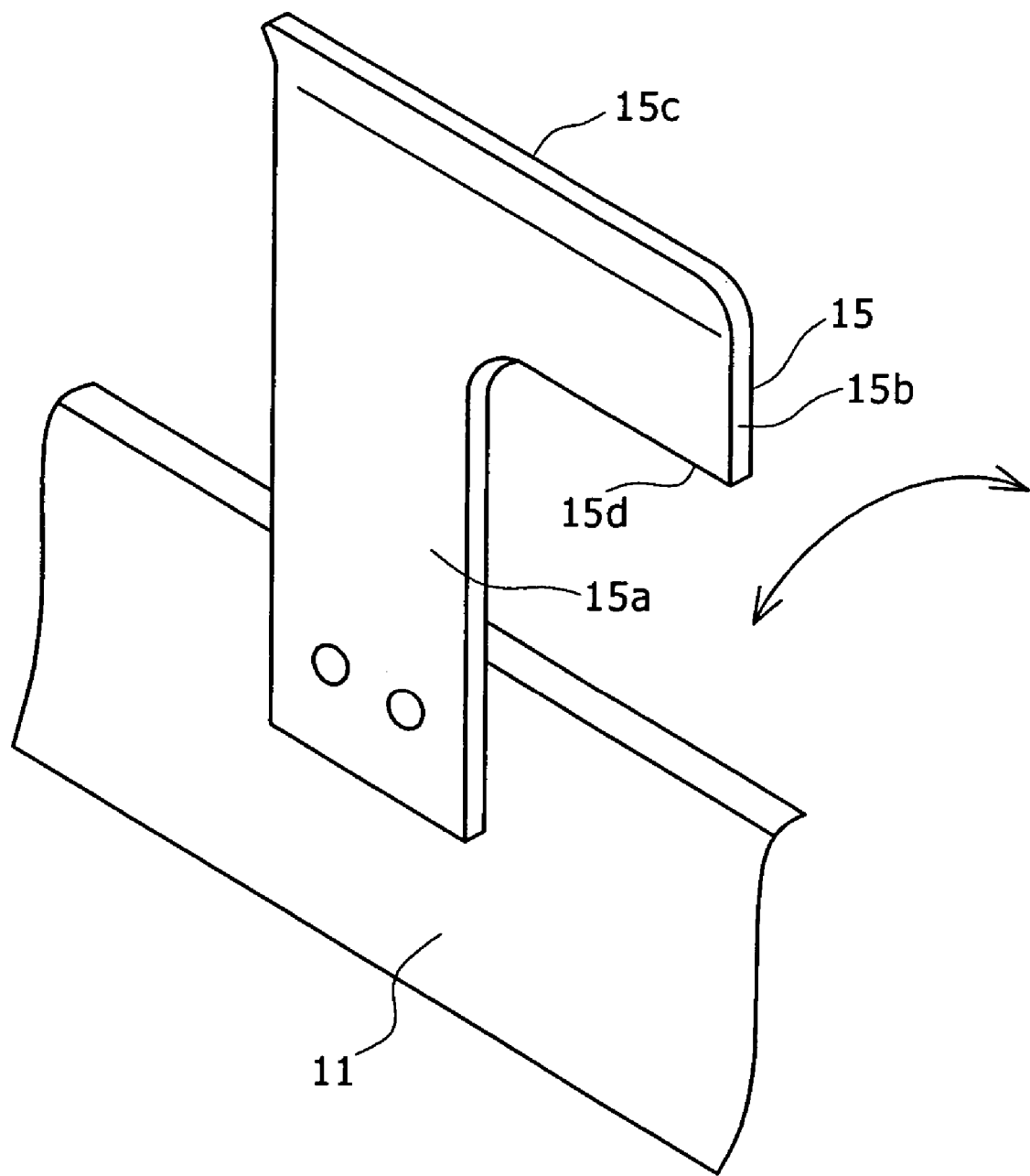
FIG. 9 is an enlarged perspective view of a lock release member.

A lock release member 15 is provided on the left side plate portion 11 of the chassis 7 at a position near the rear end thereof so as to project upward from the left side plate portion 11. As shown in FIG. 9, the lock release member 15 is composed generally of a vertical portion 15a extending in a direction perpendicular to the longitudinal direction of the left side plate portion 11 and a lock relase projecting portion 15b projecting frontward from the upper end of the vertical portion 15a. The upper end of the lock release member 15 is so bent as to be inclined to the left side of the chassis 7 to form a guide portion 15c. The lower edge of the lock release projecting portion 15b is formed as a release operation edge 15d.

Referring back to FIGS. 7 and 8, a disk table 16 is located in the table location hole 9a of the base portion 9. The disk table 16 has a table portion 16a and a centering projection 16b provided at the center of the table portion 16a. The disk table 16 is fixed to a motor shaft of a spindle motor (not shown). The centering portion 16b is provided with a magnet (not shown). The spindle motor is mounted on a substrate 17. The substrate 17 is fixedly mounted to the base portion 9 at an opening edge of the table location hole 9a in the condition where the disk table 16 projects upward from the table location hole 9a. The disk table 16 is rotated by operating the spindle motor.

An optical pickup 18 is located in the pickup location hole 9b of the base portion 9. The optical pickup 18, the disk table 16, and the spindle motor constitute a recording/reproducing system for recording and/or reproducing an information signal on the recording medium 200 of the recording medium cartridge 100.

The optical pickup 18 has a moving base 19 and an objective lens driving device 20 supported on the moving base 19. The moving base 19 is provided with a pair of bearing portions 19a and 19b. A lead screw 21 is threadedly inserted through the bearing portion 19a, and the bearing portion 19b is supported to a guide shaft 22. A worm 23 is fixed to the front end of the lead screw 21.

The lead screw 21 is rotatably supported to the base portion 9 on the lower side thereof, and the guide shaft 22 is fixed to the base portion 9 on the lower side thereof. Accordingly, the optical pickup 18 is movable in the pickup location hole 9b relative to the chassis 7 as being guided by the guide shaft 22 by the rotation of the lead screw 21.

A drive motor 24 is located in the motor location hole 9c of the base portion 9. The drive motor 24 is provided with a pair of brackets 25 projecting sideward in opposite directions. A drive gear 26 is located on the lower side of the drive motor 24 and is fixed to a motor shaft of the drive motor 24. A flexible printed wiring board 27 is connected to the drive motor 24. A drive current is supplied from a drive circuit through the flexible printed wiring board 27 to the drive motor 24.

The pair of brackets 25 are mounted to the chassis 7 to thereby fix the drive motor 24 in the motor location hole 9c.

A transmission gear 29 is supported through a support shaft 28 to the base portion 9 on the lower side thereof. The transmission gear 29 is in mesh with both the drive gear 26 and the worm 23 fixed to the lead screw 21. Accordingly, a driving force of the drive motor 24 is transmitted through the drive gear 26, the transmission gear 29, and the worm 23 to the lead screw 21, thereby rotating the lead screw 21. As a result, the optical pickup 18 is moved in a lateral direction of the chassis 7 according to a rotational direction of the drive motor 24.

The holder 8 is also an integral member formed of a sheet metal material, for example. As shown in FIG. 7, the holder 8 is composed of an upper plate portion 30 having a substantially square shape, a pair of side plate portions 31 and 32 depending from the left and right side edges of the upper plate portion 30, respectively, a pair of lower plate portions 33 and 34 projecting from the lower edges of the side plate portions 31 and 32, respectively, in opposite directions toward each other, and a pair of front plate portions 35 depending from the front edges of the lower plate portions 33 and 34, respectively.

Accordingly, the holder 8 has a space surrounded by the upper plate portion 30, the left and right side plate portions 31 and 32, and the left and right lower plate portions 33 and 34. Further, the front opening of the holder 8 is formed as an insert opening 36 for insertion of the recording medium cartridge 100.

A pair of pivot holes 31a and 32a are formed at the rear ends of the side plate portions 31 and 32 of the holder 8, respectively.

Figure 10:
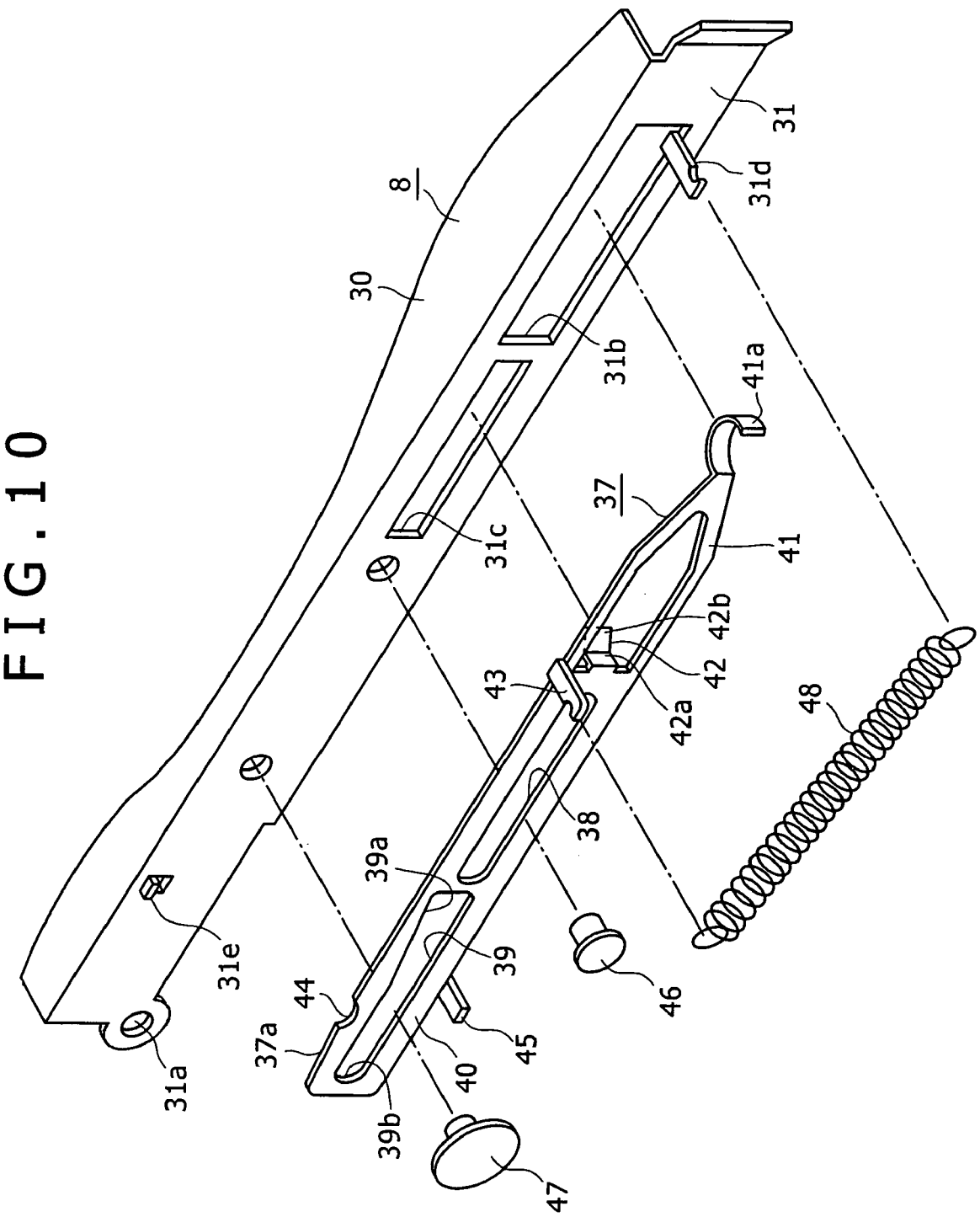
FIG. 10 is an enlarged exploded perspective view of an essential part of the recording medium drive apparatus including a holder and an eject lever.

As shown in FIGS. 7 and 10, the left side plate portion 31 is formed at its front portion with a first projection insert hole 31b and a second projection insert hole 31c both elongated and spaced from each other in the longitudinal direction of the holder 8. The left side plate portion 31 is further formed at its front end portion with a spring hook 31d projecting outward from the lower opening edge of the first projection insert hole 31b. The left side plate portion 31 is further formed at its rear portion with a locking portion 31e projecting outward of the holder 8.

Figure 11:
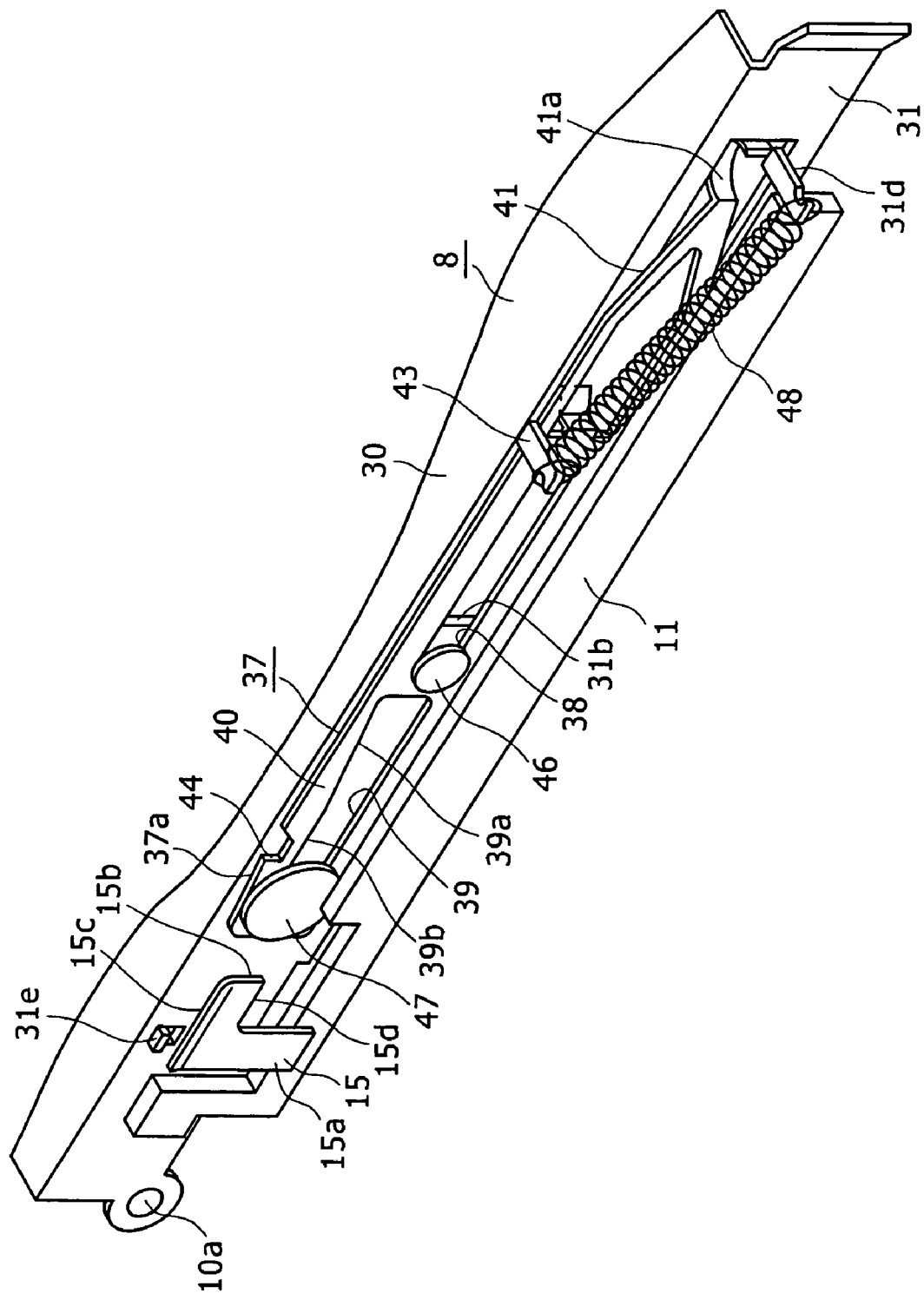
FIG. 11 is an enlarged perspective view of the essential part shown in FIG. 10.

As shown in FIGS. 10 and 11, an eject lever 37 is supported to the left side plate portion 31 so as to be slidable in the longitudinal direction of the holder 8, i.e., in the inserting and ejecting directions of the recording medium cartridge 100 with respect to the holder 8.

The eject lever 37 is formed from a platelike member elongated in the longitudinal direction of the holder 8. The eject lever 37 is formed with a pair of supported holes 38 and 39 at longitudinally central and rear portions. Both the supported holes 38 and 39 are elongated in the longitudinal direction of the eject lever 37.

The front supported hole 38 has a fixed width over the length thereof. On the other hand, the rear supported hole 39 is composed of a displacing portion 39a as a front half portion and a nondisplacing portion 39b as a rear half portion. The displacing portion 39a has a width increasing with a change in position toward the front end of the eject lever 37, and the nondisplacing portion 39b has a fixed width over the length thereof.

The longitudinally central and rear portions of the eject lever 37 where the supported holes 38 and 39 are formed function as a supported portion 40, and the remaining front portion of the eject lever 37 as formed on the front side of the supported portion 40 functions as an elastic deforming portion 41. The elastic deforming portion 41 is elastically deformable with respect to the supported portion 40 in the lateral direction of the holder 8 (in the direction of thickness of the supported portion 40). The elastic deforming portion 41 has an arcuate front end portion 41a convex toward the right side of the holder 8. This convex portion 41a functions as an undue ejection preventing projection for preventing undue ejection of the recording medium cartridge 100.

The eject lever 37 is further formed with an engaging projection 42 projecting rightward of the holder 8. The engaging projection 42 is located at the front end of the supported portion 40. The engaging projection 42 has a laterally extending flat portion 42a projecting rightward from the front end of the supported portion 40 and an inclined portion 42b contiguous to the flat portion 42a and displaced frontward with a rightward change in position from the flat portion 42a.

The eject lever 37 is further formed with a spring hook 43 projecting leftward from a position above the engaging projection 42.

The eject lever 37 is further formed with a locking recess 44 opening upward from the upper edge of the supported portion 40 near the rear end thereof. Further, the eject lever 37 is formed with an operating projection 45 projecting leftward from the lower edge of the supported portion 40. A part of the upper edge of the supported portion 40 of the eject lever 37 as extending rearward of the locking recess 44 is formed as an inclined edge 37a displaced downward with a rearward change in position from the locking recess 44.

A pair of support pins 46 and 47 are inserted through the supported holes 38 and 39 of the eject lever 37, respectively, and are mounted to the left side plate portion 31 of the holder 8, thereby slidably supporting the eject lever 37 to the left side plate portion 31 of the holder 8 (see FIGS. 8 and 11).

In the condition where the eject lever 37 is supported to the left side plate portion 31 of the holder 8, a biasing spring 48 is supported between the spring hook 31d of the side plate portion 31 and the spring hook 43 of the eject lever 37. The biasing spring 48 is an extension coil spring for normally biasing the eject lever 37 toward the front end of the holder 8.

The spring hook 31d is located near the lower edge of the side plate portion 31, and the spring hook 43 is located at the upper edge of the eject lever 37. Accordingly, the biasing spring 48 also applies to the eject lever 37 a rotational force (as shown by an arrow R in FIG. 12) about the front support pin 46 in such a manner that the front end of the eject lever 37 is lowered and the rear end of the eject lever 37 is raised.

In the condition where the eject lever 37 is supported to the side plate portion 31 of the holder 8, the convex portion 41a and the engaging projection 42 are inserted through the first projection insert hole 31b and the second projection insert hole 31c of the side plate portion 31 into the holder 8, respectively.

As shown in FIG. 7, the lower plate portions 33 and 34 of the holder 8 are formed at their front end portions with a pair of projection insert holes 33a and 34a for insertion of the positioning pins 13 of the chassis 7.

A drop preventing member 49 is mounted on the upper surfaces of the lower plate portions 33 and 34. The drop preventing member 49 is elongated in the lateral direction of the holder 8 and has a function of preventing possible drop of the recording medium cartridge 100 between the lower plate portions 33 and 34 when the recording medium cartridge 100 is inserted into the holder 8.

The pivot pins 10a of the support projections 10 formed at the rear end of the chassis 7 are inserted through the pivot holes 31a and 32a formed at the rear ends of the side plate portions 31 and 32 of the holder 8, respectively, so that the holder 8 is supported to the chassis 7 so as to be pivotable about the pivot pins 10a.

Four dampers 50 are mounted on the damper mounting portions 14 of the chassis 7, respectively. Each damper 50 is fitted into the mounting recess 14a of the corresponding damper mounting portion 14 from the rear or front side of the chassis 7, and is fixed to the inside of the housing 2 by means of a screw 51.

The operation of this preferred embodiment in inserting the recording medium cartridge 100 into the holder 8 and in ejecting the recording medium cartridge 100 from the holder 8 will now be described with reference to FIGS. 6 and 12 to 23.

When the lid 5 of the electronic equipment 1 is opened as shown in FIG. 6, the holder 8 is pivotally moved relative to the chassis 7 in concert with the lid 5, thus obtaining an open position where the recording medium cartridge 100 can be inserted into the holder 8.

Figure 12:
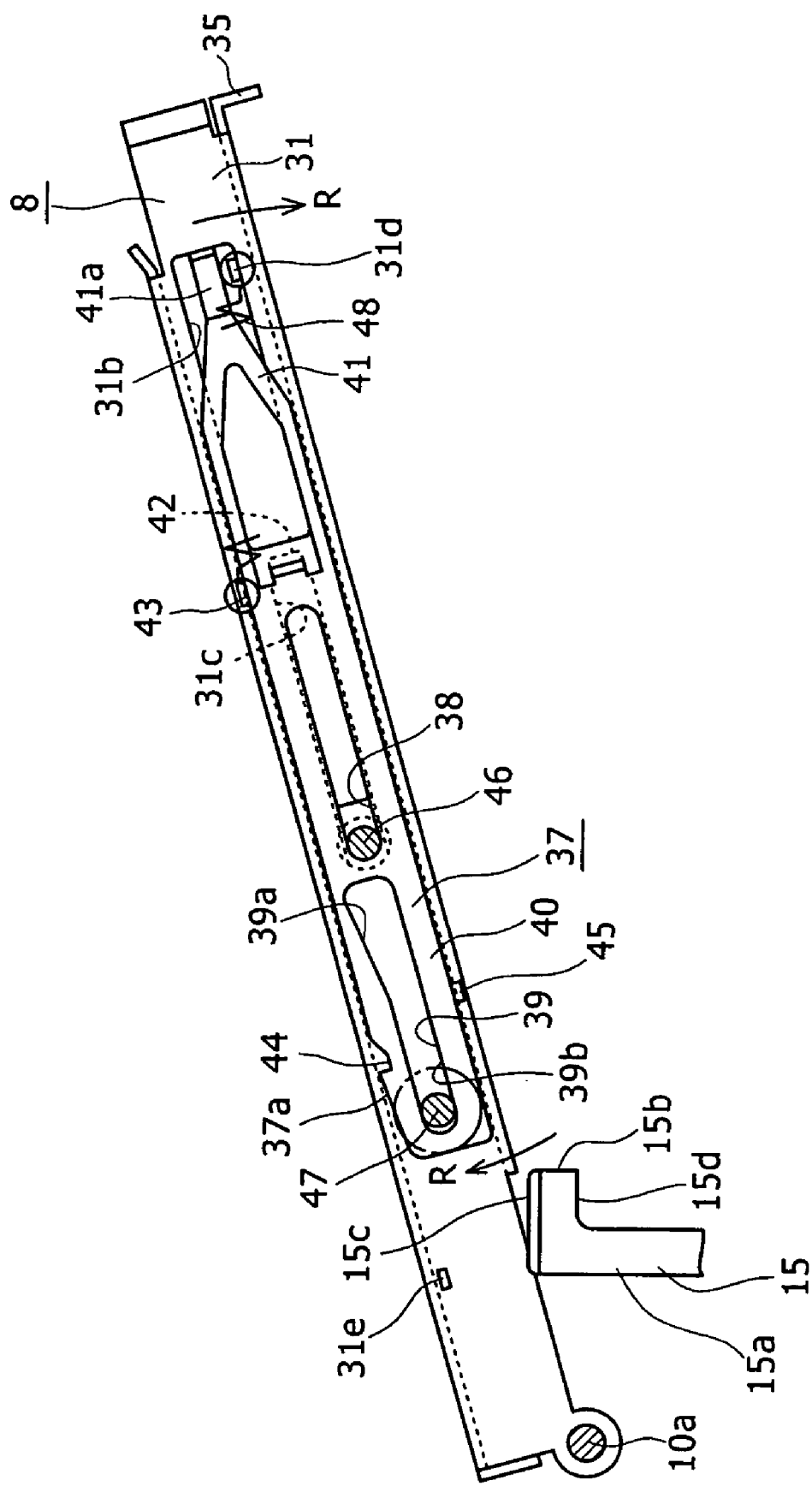
FIG. 12 is an enlarged side view showing a condition where the recording medium cartridge is not yet inserted into the holder.

Before the recording medium cartridge 100 is inserted into the holder 8, the eject lever 37 is kept at its front end position by the biasing force of the biasing spring 48 as shown in FIG. 12. In this front end position, the eject lever 37 is located on the front side of the locking portion 31e of the holder 8. Further, the convex portion 41a and the engaging projection 42 of the eject lever 37 are located at the front ends of the first and second projection insert holes 31b and 31c of the holder 8, respectively.

Figure 13:
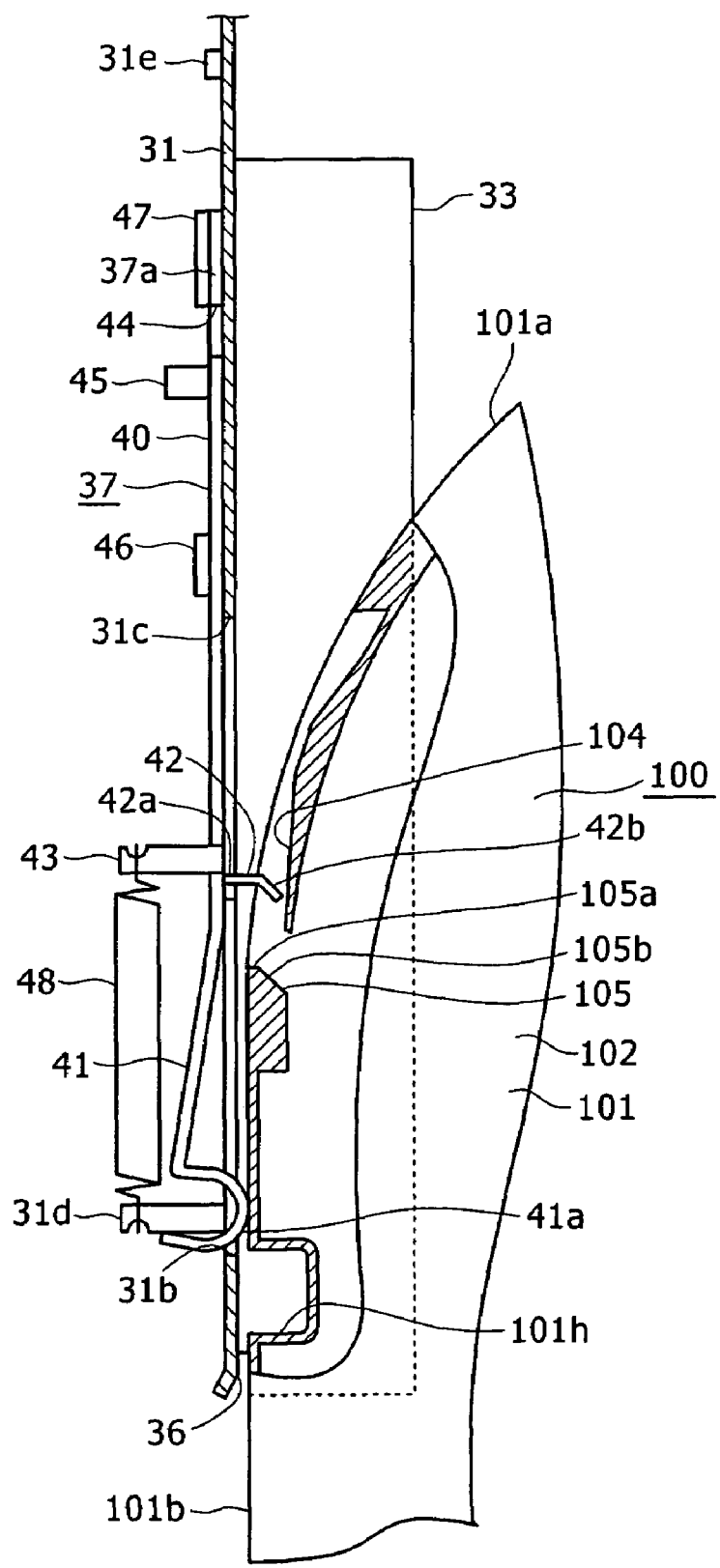
FIG. 13 is an enlarged sectional view showing a condition where the recording medium cartridge is inserted into the holder and an elastic deforming portion of the eject lever is deformed.

When the recording medium cartridge 100 is inserted into the holder 8 as shown in FIG. 13, the side surface 101b of the recording medium cartridge 100 comes into sliding contact with the convex portion 41a of the eject lever 37, so that the elastic deforming portion 41 is elastically deformed and the convex portion 41a comes out of the holder 8. At this time, the eject lever 37 is not moved in the longitudinal direction of the holder 8.

Figure 14:
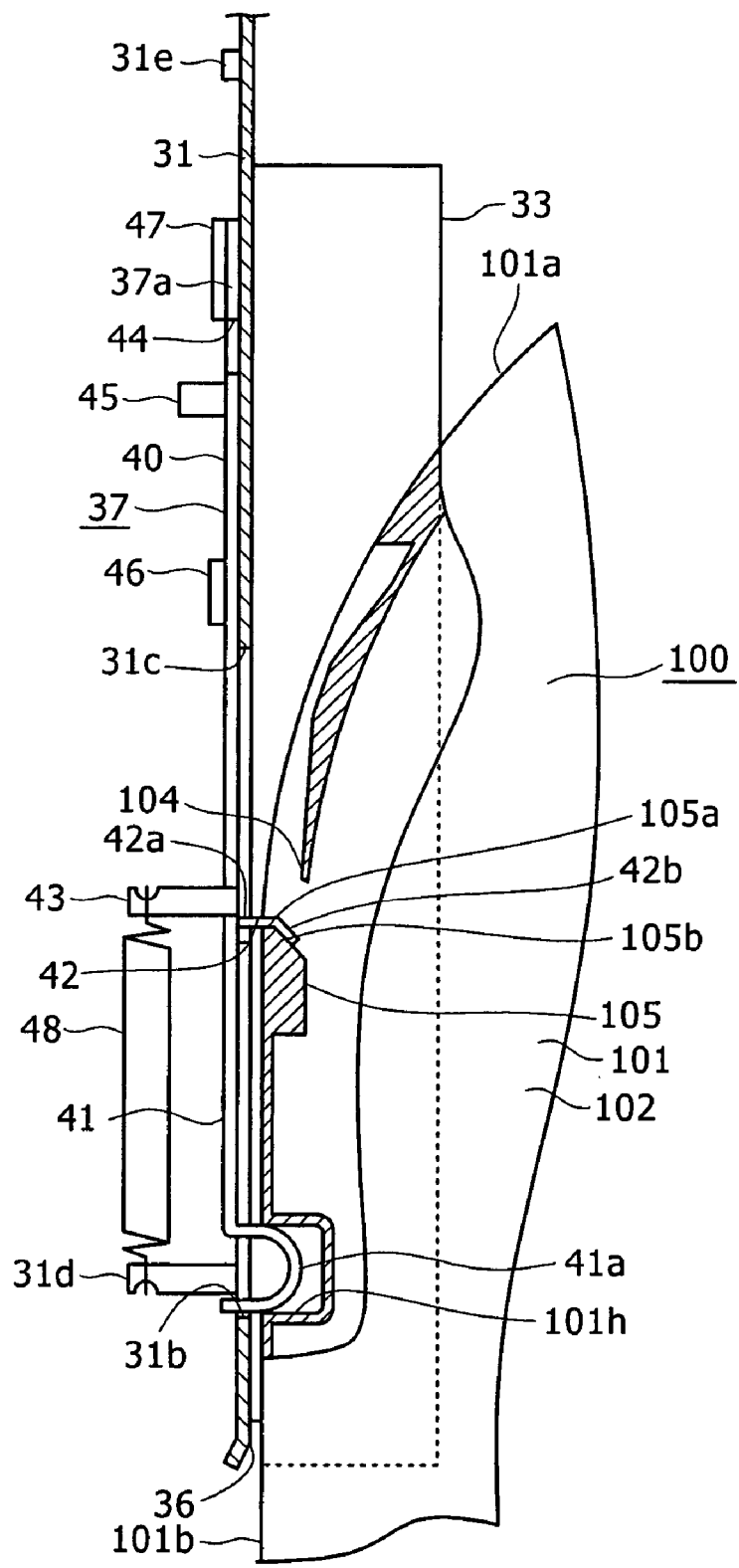
FIG. 14 is an enlarged sectional view showing a condition where a projected portion of the eject lever is engaged with an engagement recess of the recording medium cartridge after the condition shown in FIG. 13.

When the recording medium cartridge 100 is further inserted into the holder 8, the engagement recess 101h of the recording medium cartridge 100 comes to a position corresponding to the convex portion 41a of the eject lever 37, and the elastic deforming portion 41 deformed by the sliding contact between the cartridge 100 and the elastic deforming portion 41 elastically restores its original condition to thereby engage the convex portion 41a into the engagement recess 101h as shown in FIG. 14. At the same time, the engaging projection 42 of the eject lever 37 is relatively inserted into the engagement groove 104 of the recording medium cartridge 100, and the engaging portion 105 of the cartridge 100 comes into abutment against the engaging projection 42.

When the recording medium cartridge 100 is further inserted into the holder 8, the engaging projection 42 of the eject lever 37 is pushed rearward by the engaging portion 105 of the cartridge 100. Thus, the eject lever 37 is moved rearward against the biasing force of the biasing spring 48 by the rearward movement of the recording medium cartridge 100.

Figure 15:
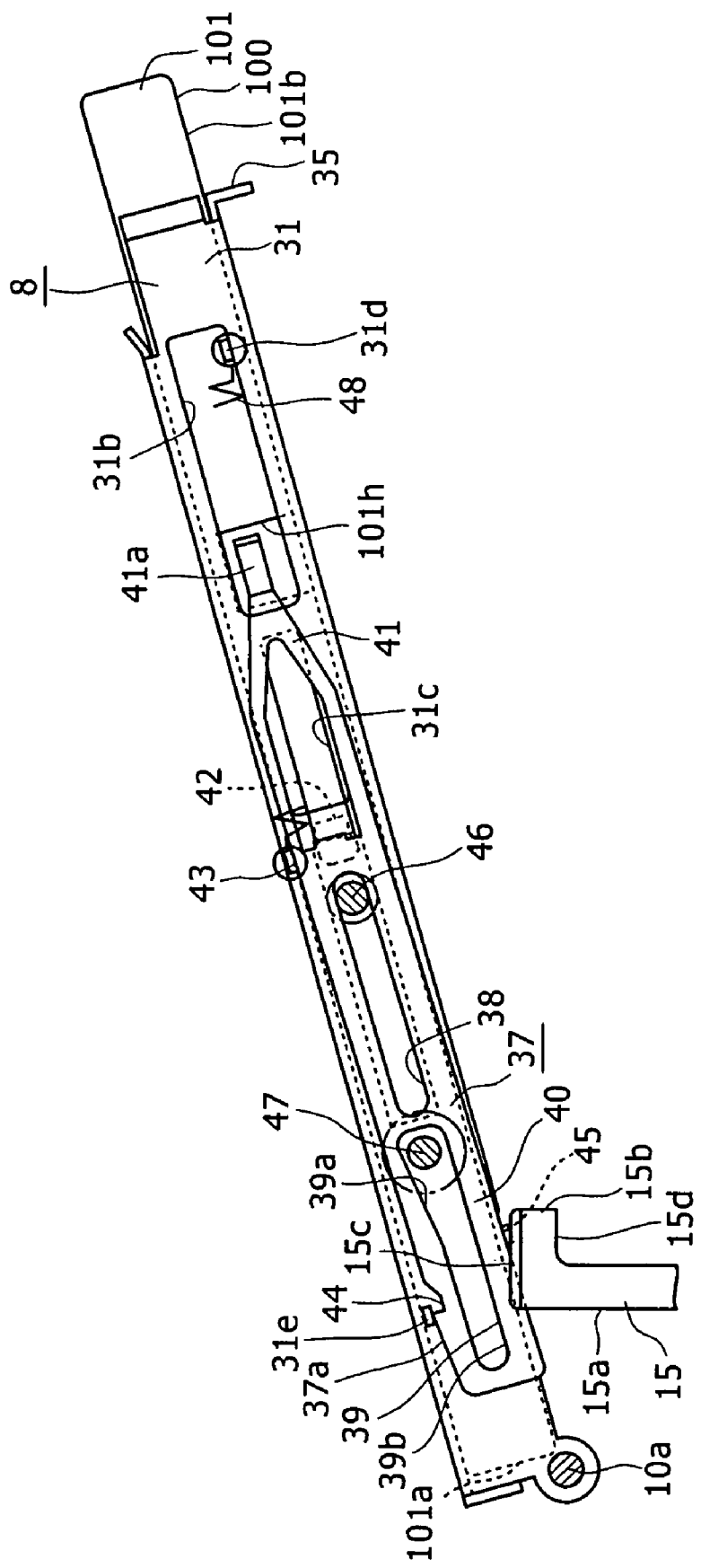
FIG. 15 is an enlarged side view showing a condition where an inclined edge of the eject lever is in sliding contact with a locking portion of the holder.

When the eject lever 37 is thus moved rearward, the inclined edge 37a comes into sliding contact with the locking portion 31e of the holder 8 as shown in FIG. 15. At this time, the rear support pin 47 is located in the displacing portion 39a of the rear supported hole 39 of the eject lever 37, and the eject lever 37 is rotated about the front support pin 46 in such a direction that the rear end of the eject lever 37 is lowered by the sliding contact between the inclined edge 37a and the locking portion 31e. As mentioned above, the eject lever 37 is normally biased by the biasing spring 48 so as to be rotated about the front support pin 46 in such a direction that the front end of the eject lever 37 is lowered and the rear end of the eject lever 37 is raised. Accordingly, the rotation of the eject lever 37 about the support pin 46 by the sliding contact between the inclined edge 37a and the locking portion 31e is performed against the biasing force of the biasing spring 48.

Figure 16:
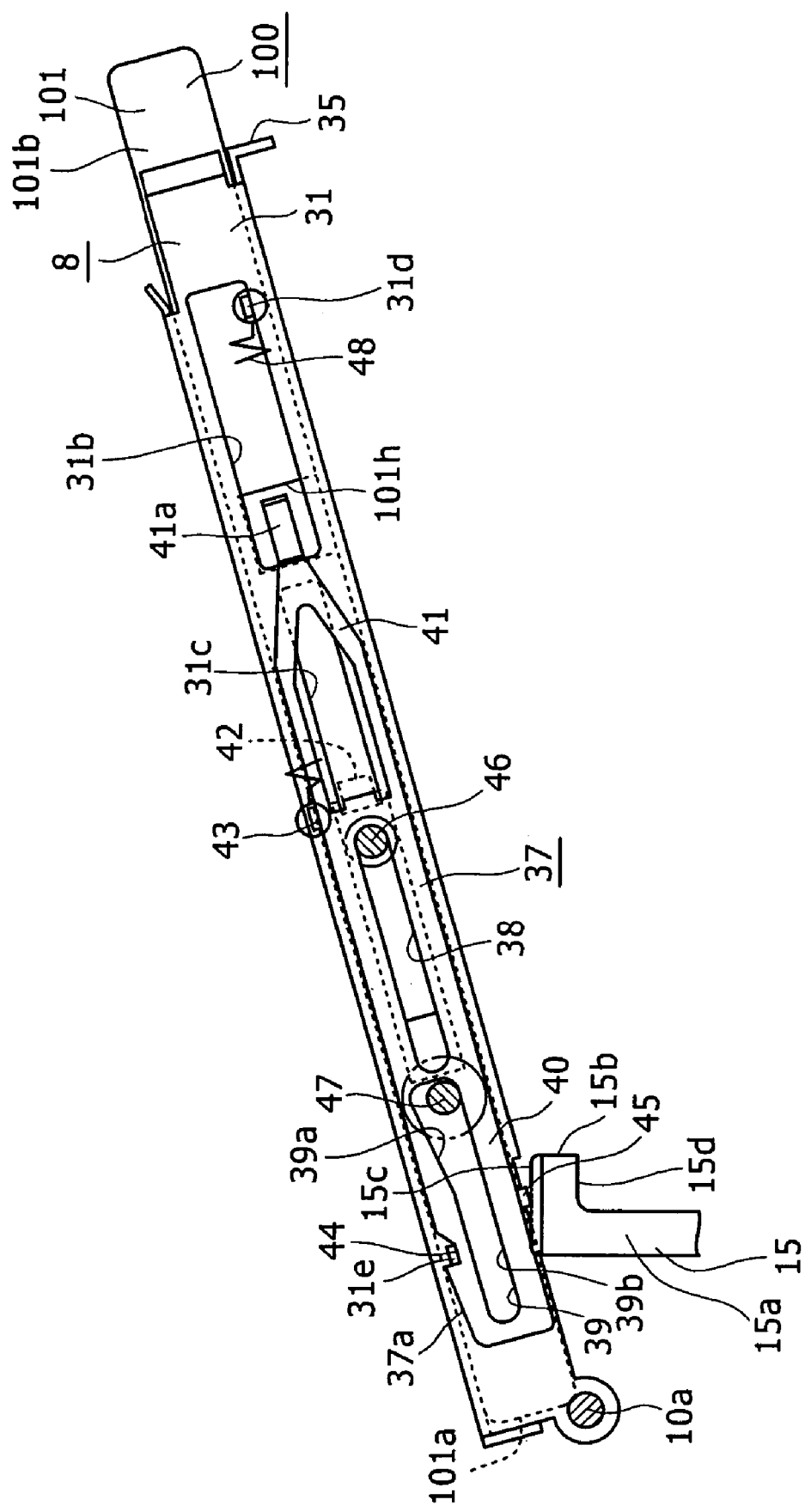
FIG. 16 is an enlarged side view showing a condition where the eject lever is locked to the holder.

When the eject lever 37 is further moved rearward, the locking recess 44 of the eject lever 37 comes to a position corresponding to the locking portion 31e, and the eject lever 37 is rotated by the biasing force of the biasing spring 48 in such a direction that the rear end of the eject lever 37 is raised. Accordingly, the locking recess 44 of the eject lever 37 is brought into engagement with the locking portion 31e, thereby locking the eject lever 37 with respect to the holder 8 as shown in FIG. 16.

Figure 17:
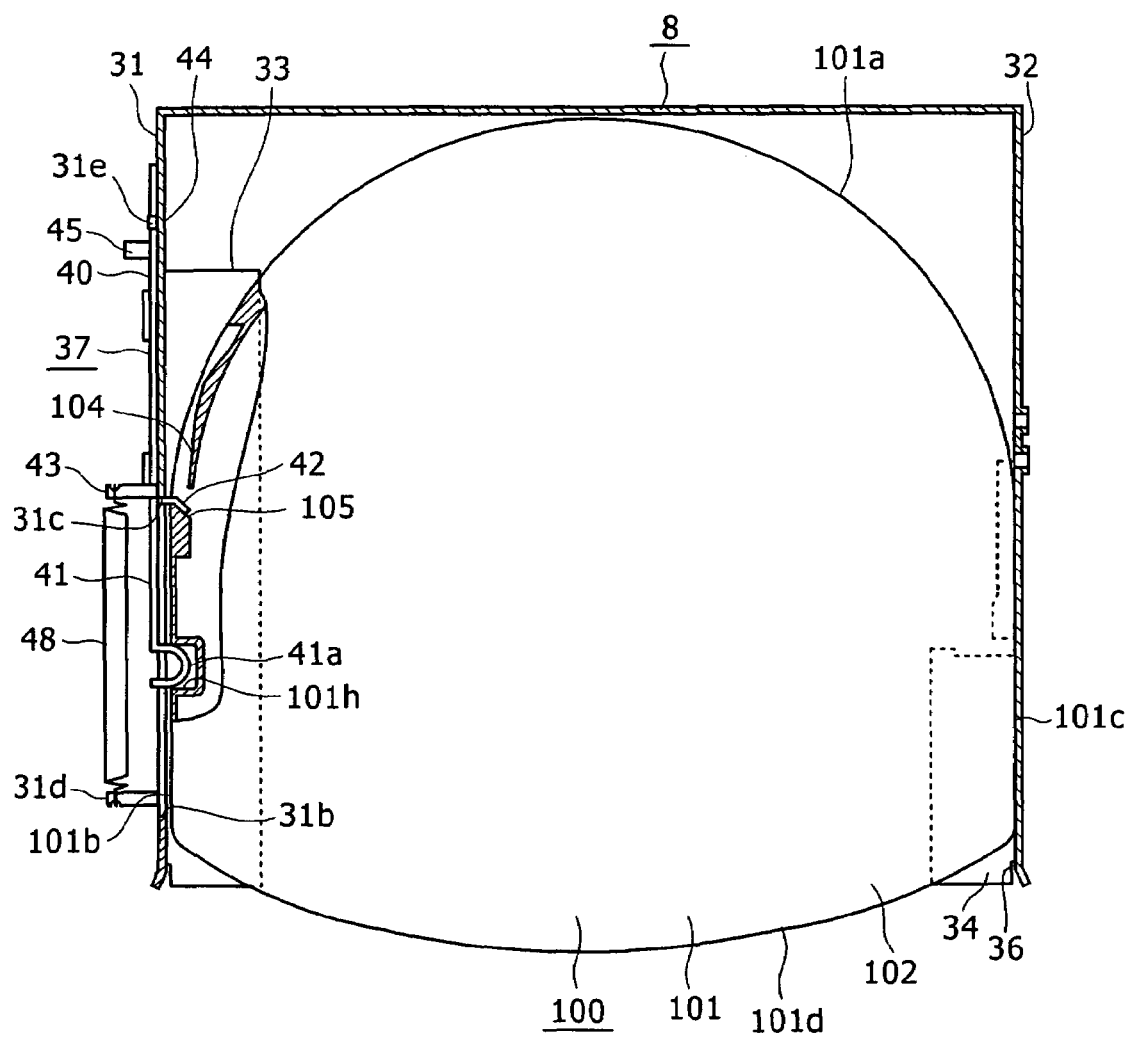
FIG. 17 is a partially sectional, enlarged plan view showing a condition where the insertion of the recording medium cartridge into the holder is completed.

In this condition where the eject lever 37 is locked with respect to the holder 8, the eject lever 37 is kept at its rear end position and the insertion of the recording medium cartridge 100 into the holder 8 has just been completed as shown in FIG. 17.

Thereafter, the holder 8 thus holding the recording medium cartridge 100 is pivotally moved relative to the chassis 7 by depressing the lid 5 toward the chassis 7, i.e., by closing the lid 5.

Figure 18:
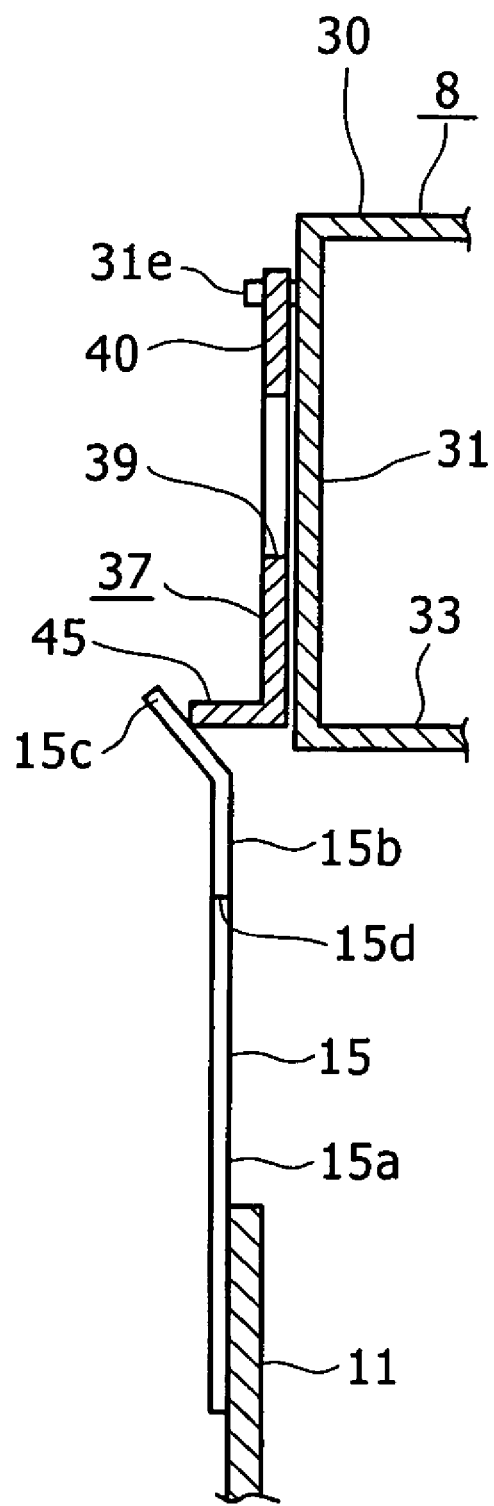
FIG. 18 is a partially sectional, enlarged view showing a condition where an operating projection of the eject lever comes into contact with a guide portion of the lock release member.

The holder 8 is pivotally moved about the pivot pins 10a of the support projections 10 of the chassis 7. In concert therewith, the operating projection 45 of the eject lever 37 comes into sliding contact with the guide portion 15c of the lock release member 15 of the chassis 7 as shown in FIG. 18.

Figure 19:
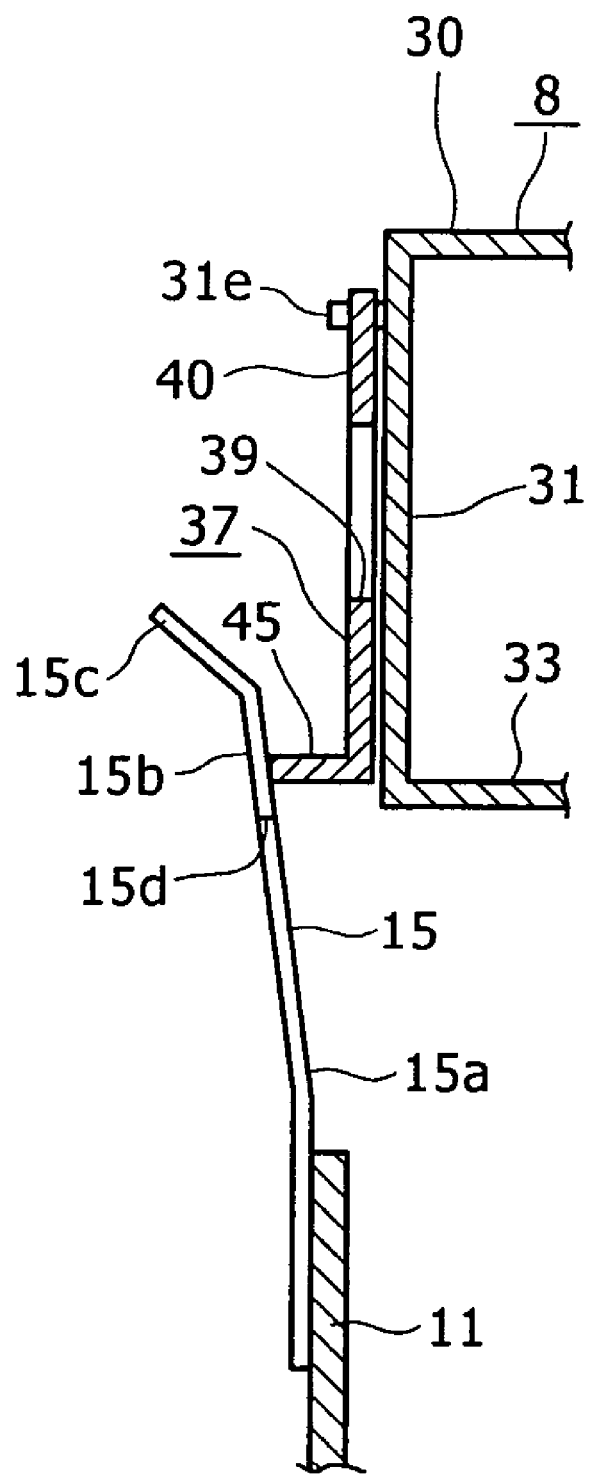
FIG. 19 is a view similar to FIG. 18, showing a condition where the operating projection is in sliding contact with a lock release projecting portion of the lock release member after the condition shown in FIG. 18.

When the holder 8 is further pivotally moved, the operating projection 45 is lowered as being guided by the guide portion 15c of the lock release member 15. At this time, the lock release member 15 is elastically deformed so as to be inclined leftward as shown in FIG. 19.

Figure 20:
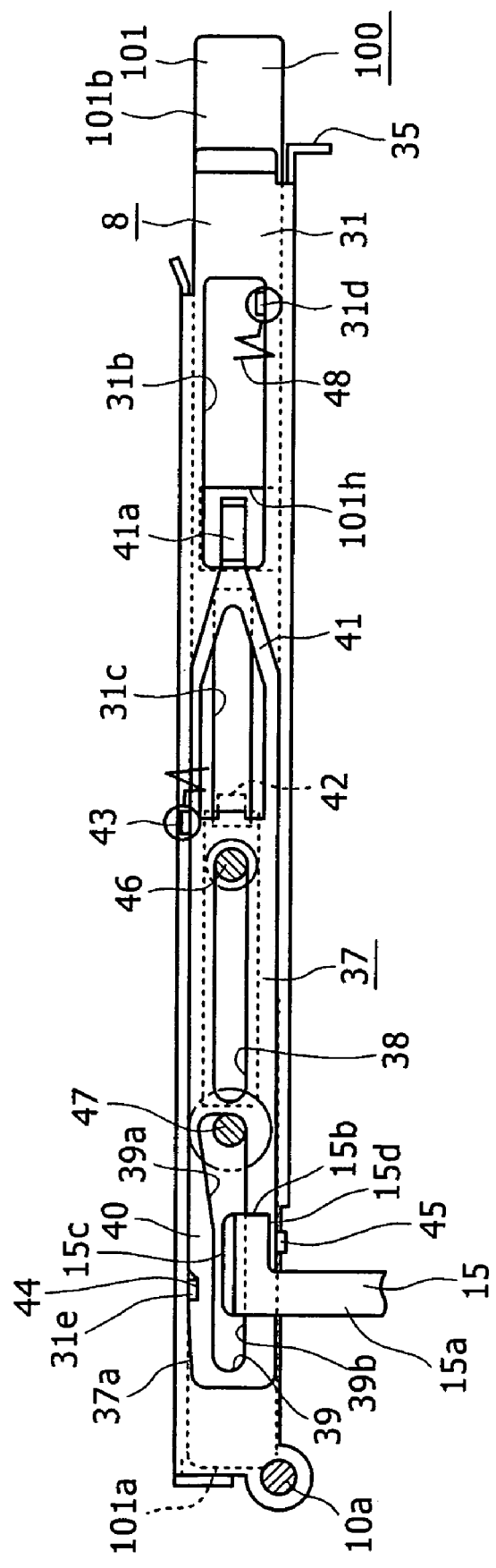
FIG. 20 is an enlarged side view showing a condition where the pivotal movement of the holder is completed in the insert operation of the recording medium cartridge.

When the holder 8 is further pivotally moved, the operating projection 45 comes to a position under the release operation edge 15d formed as the lower edge of the lock release projecting portion 15b of the lock release member 15 as shown in FIG. 20.

In this position where the operating projection 45 is located under the release operation edge 15d, the lid 5 is locked by the locking mechanism, thus completing the pivotal operation of the holder 8. By locking the lid 5 at its closed position, the holder 8 is kept at its closest position with respect to the chassis 7.

At the same time, the positioning pins 13 of the chassis 7 are relatively inserted through the projection insert holes 33a and 34a of the holder 8 into the positioning holes 101g of the case 101 of the recording medium cartridge 100, thereby positioning the recording medium cartridge 100 with respect to the chassis 7. Further, the disk table 16 is relatively inserted into the disk insert hole 101e of the case 101, and the core 201 of the recording medium 200 is attracted to the magnet of the centering projection 16b of the disk table 16, thereby mounting the recording medium 200 on the disk table 16.

The recording medium cartridge 100 is held in the condition where the lower surface of the case 101 is in contact with the support pads 12 of the chassis 7.

The recording medium 200 mounted on the disk table 16 is rotated with the disk table 16 by the spindle motor, and an information signal is recorded or reproduced on the recording medium 200 by driving the optical pickup 18.

When the recording or reproduction of the information signal on the recording medium 200 is finished and the lid 5 is opened again, the holder 8 is pivotally moved away from the chassis 7, so that the recording medium 200 is demounted from the disk table 16.

When the holder 8 is pivotally moved away from the chassis 7, the operating projection 45 of the eject lever 37 located under the lock release projecting portion 15b of the lock release member 15 comes into contact with the release operation edge 15d. At this time, the support pin 47 is located in the displacing portion 39a of the supported hole 39 of the eject lever 37.

Figure 21:
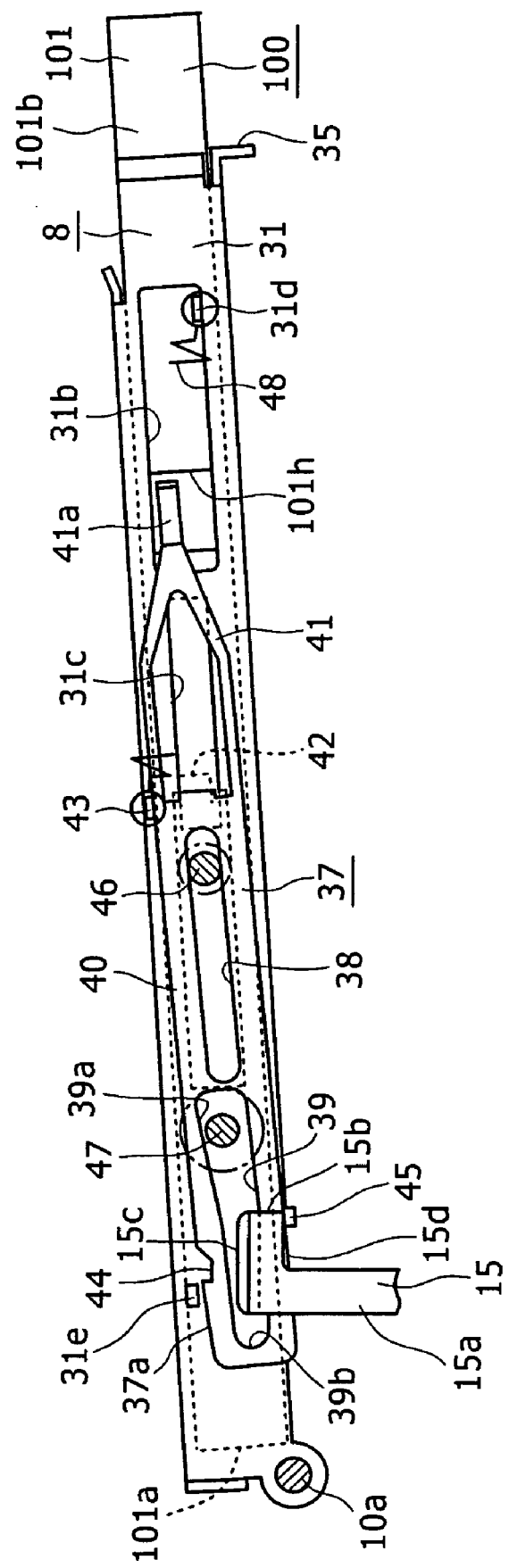
FIG. 21 is an enlarged side view showing a condition where the eject lever is unlocked from the holder.

When the holder 8 is further pivotally moved away from the chassis 7, the pivotal movement of the eject lever 37 together with the holder 8 is restricted by the contact of the operating projection 45 with the lock release member 15, and the eject lever 37 is rotated relative to the holder 8 about the support pin 46 in such a direction that the rear end of the eject lever 37 is lowered as shown in FIG. 21. By the rotation of the eject lever 37 relative to the holder 8, the engagement of the locking recess 44 of the eject lever 37 with the locking portion 31e of the holder 8 is canceled, thus unlocking the eject lever 37 from the holder 8.

When the eject lever 37 is unlocked from the holder 8, the eject lever 37 is moved frontward by the biasing force of the biasing spring 48, so that the engaging portion 105 of the recording medium cartridge 100 is pushed by the engaging projection 42 of the eject lever 37, thereby ejecting the recording medium cartridge 100 from the holder 8 in accordance with the movement of the eject lever 37.

Figure 22:
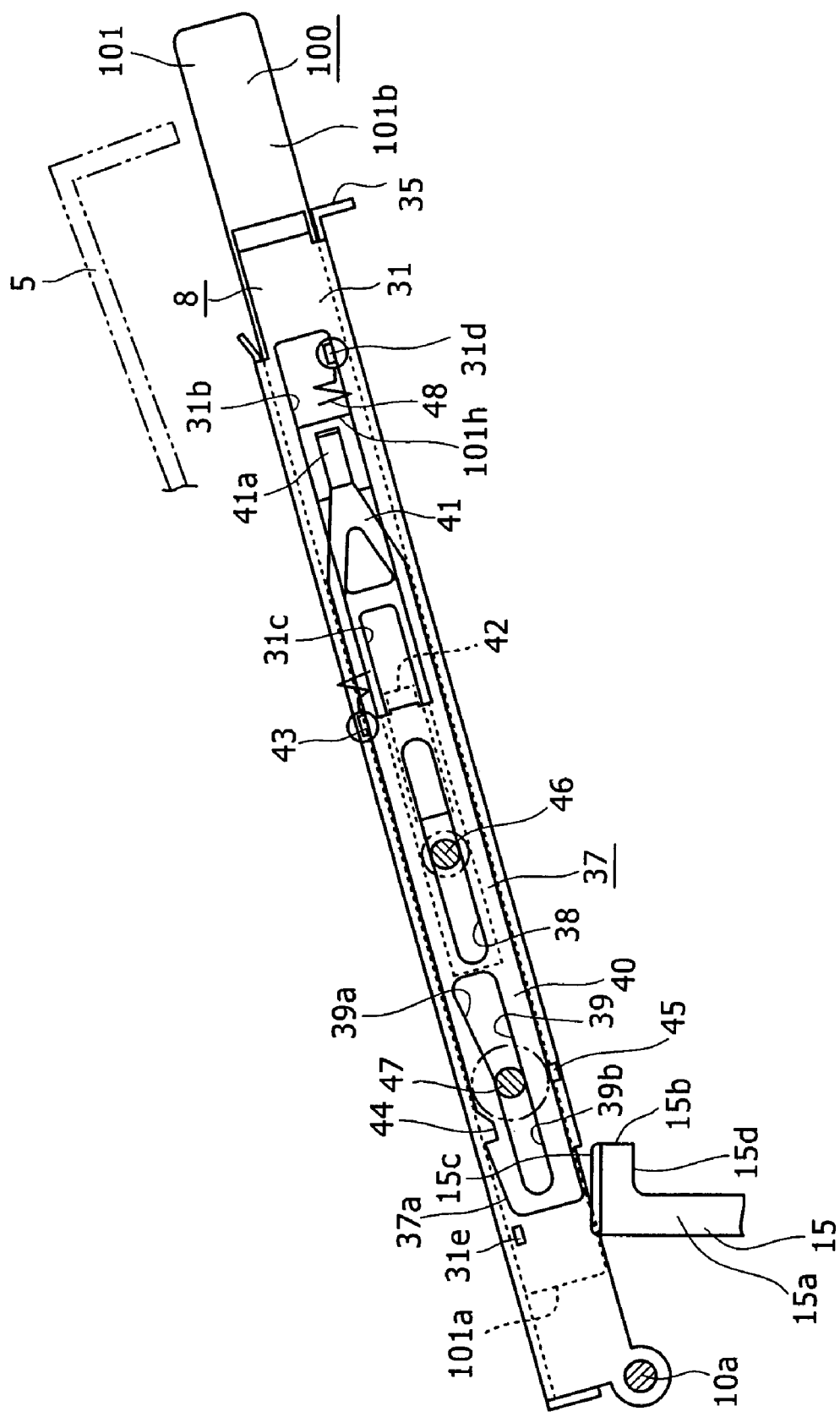
FIG. 22 is an enlarged side view showing a condition where the eject operation of the recording medium cartridge is completed.

Substantially simultaneously with the completion of the frontward movement of the eject lever 37, the pivotal movement of the holder 8 away from the chassis 7 is completed. At this time, a part of the recording medium cartridge 100 projects outward of the housing 2 as shown in FIG. 22. Further, the convex portion 41a of the eject lever 37 remains engaged with the engagement recess 101h of the recording medium cartridge 100 as shown in FIG. 23, thereby preventing undue ejection of the recording medium cartridge 100 from the holder 8.

Thus, undue ejection of the recording medium cartridge 100 from the holder 8 can be prevented by the engagement of the convex portion 41a of the eject lever 37 with the engagement recess 101h of the recording medium cartridge 100. Accordingly, in the eject operation of the recording medium cartridge 100, the whole of the recording medium cartridge 100 can be prevented from jumping out of the housing 2, thereby preventing damage to the recording medium cartridge 100 and also improving the usability in ejecting the recording medium cartridge 100.

Further, since the convex portion 41a as the undue ejection preventing projection is formed as a part of the eject lever 37, it is not necessary to provide any specific member for preventing undue ejection of the recording medium cartridge 100. Accordingly, the number of parts can be reduced and the mechanism can be simplified.

Figure 23:
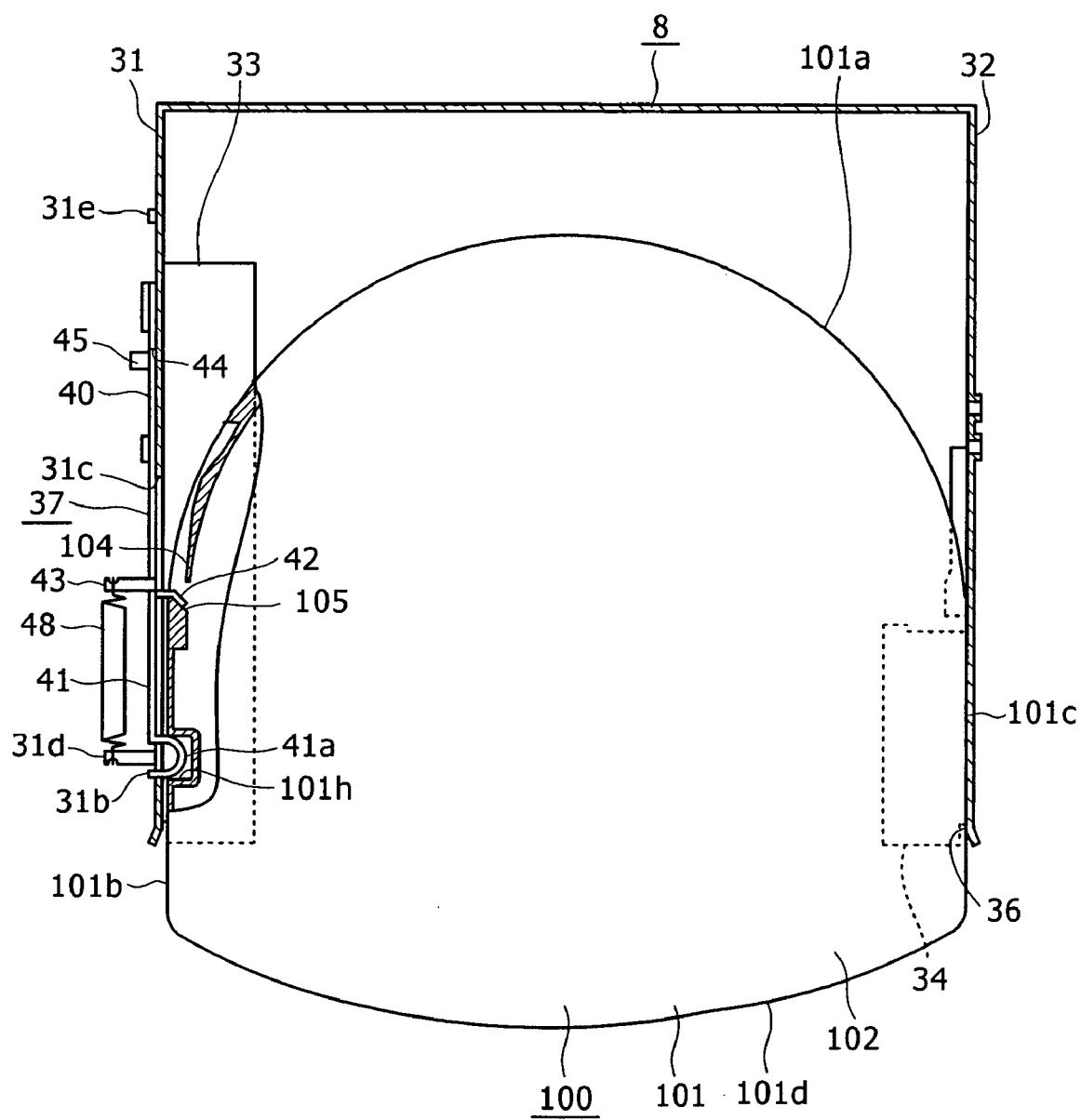
FIG. 23 is a partially sectional, plan view showing a condition where the eject operation of the recording medium cartridge is completed.
Figure 24:
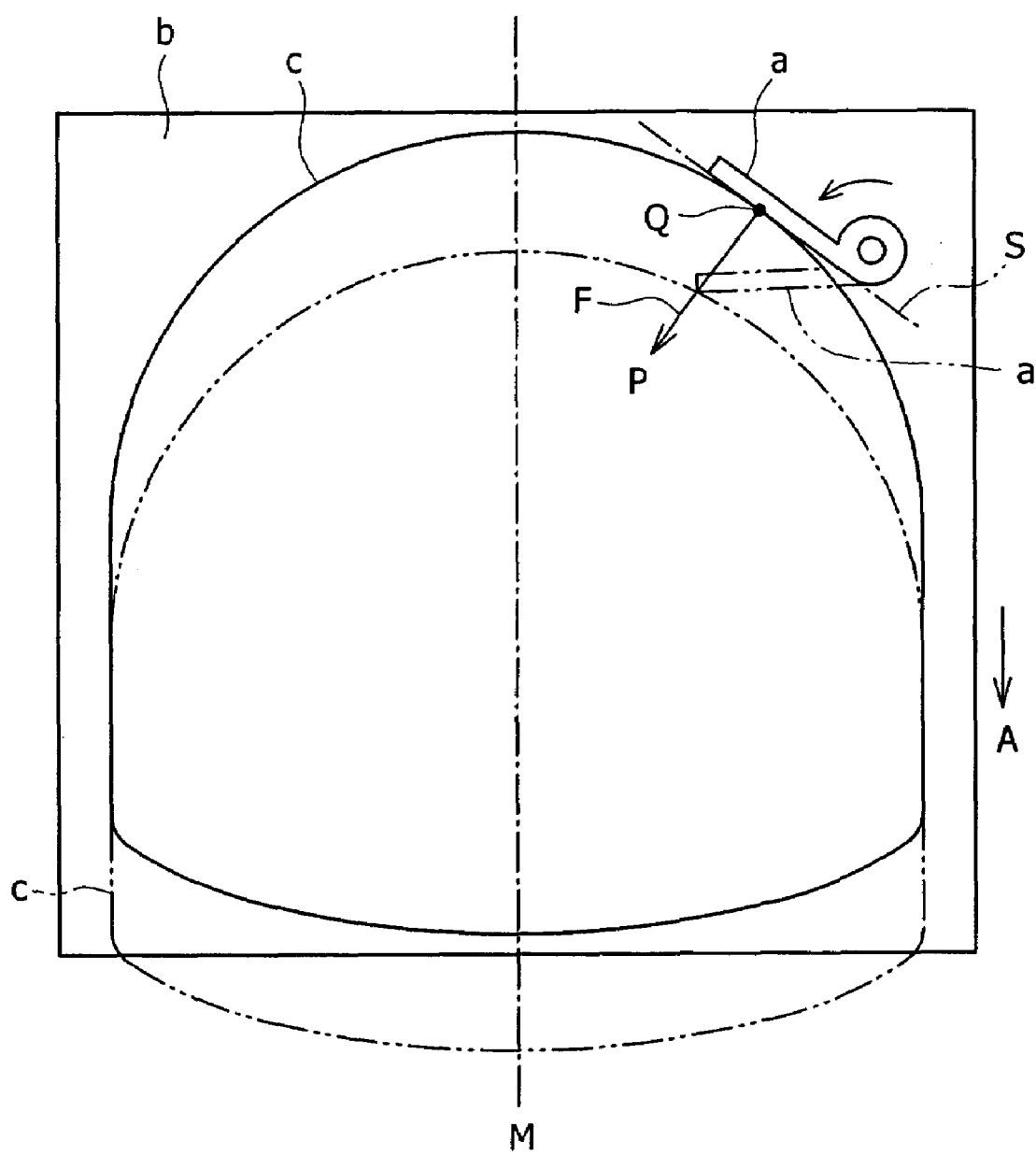
FIG. 24 is a schematic plan view showing a problem in related art.
Figure 25:
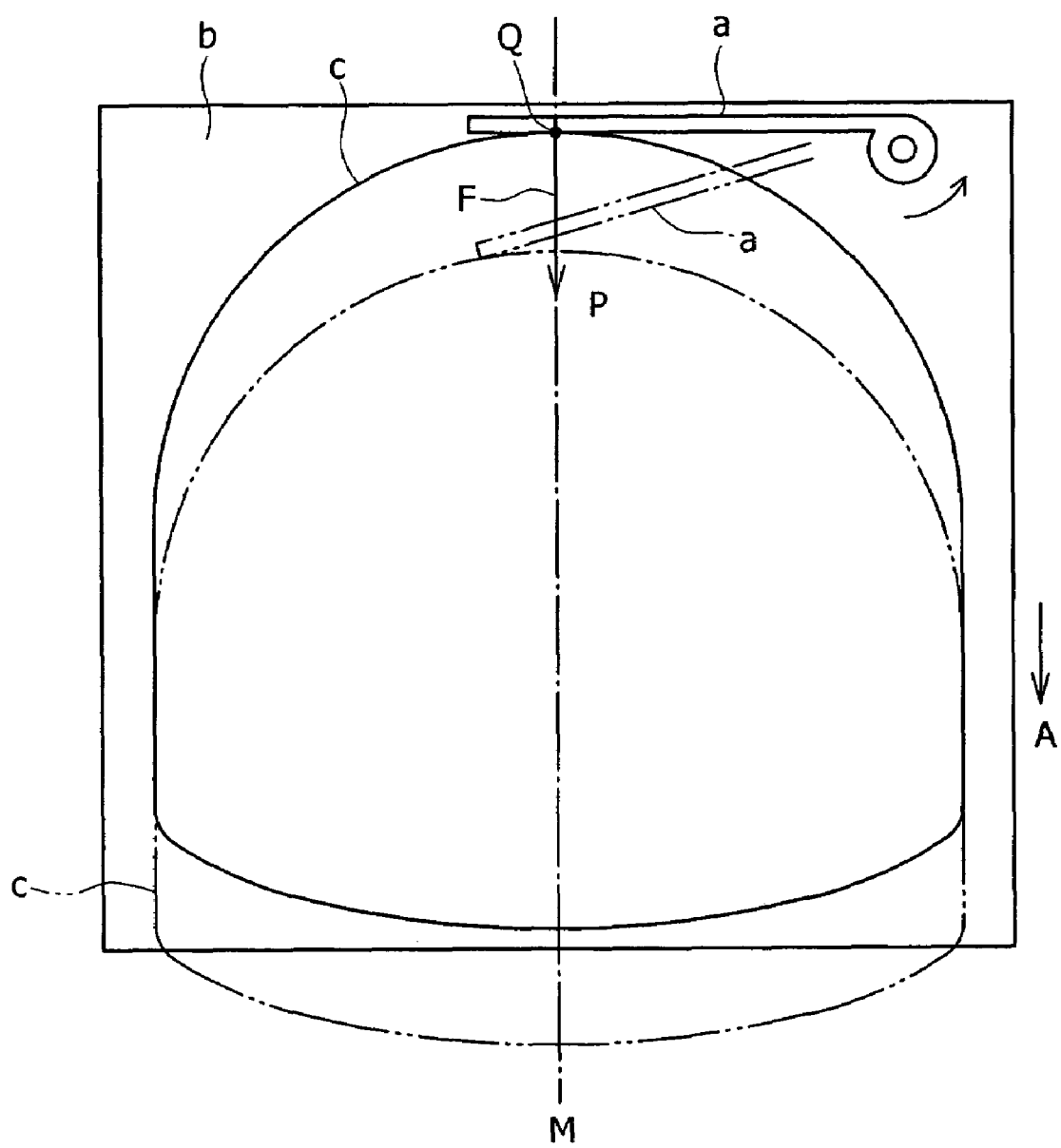
FIG. 25 is a schematic plan view showing another problem in related art.

In the ejected condition shown in FIG. 23, the recording medium cartridge 100 is pulled out of the holder 8 by the user, thus allowing the removal of the recording medium cartridge 100 from the housing 2. When the recording medium cartridge 100 is pulled out of the holder 8, the elastic deforming portion 41 is elastically deformed to disengage the convex portion 41a from the engagement hole 101h and to come out of the holder 8. Thereafter, the elastic deforming portion 41 deformed by the cartridge 100 elastically restores its original condition to thereby bring the convex portion 41a into its original position inside the holder 8.

According to this preferred embodiment, the eject lever 37 for ejecting the recording medium cartridge 100 from the holder 8 is supported to the left side plate portion 31 of the holder 8 so as to be movable in the inserting direction and the ejecting direction of the recording medium cartridge 100 with respect to the holder 8, and the eject lever 37 is normally biased in the ejecting direction. Accordingly, the eject operation of the recording medium cartridge 100 can be performed smoothly.

Further, the mechanism for performing the eject operation is compact, so that the installation space therefore can be reduced to thereby allow a size reduction of the electronic equipment 1.

Further, the engaging projection 42 of the eject lever 37 comes into engagement with the engaging portion 105 of the recording medium cartridge 100 in such a manner that the flat portion 42a of the engaging projection 42 abuts against the flat surface 105a of the engaging portion 105 and that the inclined portion 42b of the engaging projection 42 abuts against the inclined surface 105b of the engaging portion 105.

Accordingly, the engaging portion 105 is urged by the engaging projection 42 so as to be embraced by the inclined portion 42b, so that even when a lateral force is applied to the recording medium cartridge 100 in the rightward direction, the engagement of the engaging portion 105 with the engaging projection 42 can be reliably maintained, thereby improving the reliability of the insert and eject operations of the recording medium cartridge 100 with respect to the holder 8.

While the recording medium cartridge 100 does not have a shutter for openably closing the light pass hole 101f of the case 101, the recording medium cartridge usable in this preferred embodiment is not limited to the recording medium cartridge 100 having no shutter, but a recording medium cartridge having a shutter may be used. In the case of using such a recording medium cartridge having a shutter, the shutter is opened by a shutter opening/closing mechanism in inserting the recording medium cartridge into the holder 8, and is closed by the shutter opening/closing mechanism in ejecting the recording medium cartridge from the holder 8.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A recording medium drive apparatus adapted to use a recording medium cartridge having a case and a recording medium accommodated in said case, said case having a substantially arcuate circumferential surface and a pair of straight side surfaces respectively contiguous to opposite ends of said arcuate circumferential surface, at least one of said side surfaces being formed with an engagement groove at a position near said arcuate circumferential surface, said engagement groove including an engaging portion, said recording medium drive apparatus comprising:
    a holder for holding said recording medium cartridge inserted, said holder having a pair of side plate portions respectively extending along said side surfaces of said recording medium cartridge;
    a recording/reproducing system for recording and/or reproducing an information signal on said recording medium;
    a chassis for mounting said recording/reproducing system;
    an eject lever supported to one of said side plate portions of said holder so as to be movable in an inserting direction of said recording medium cartridge into said holder and in an ejecting direction of said recording medium cartridge from said holder opposite to said inserting direction, said eject lever having a supported portion supported to said one side plate portion of said holder and an engaging projection projecting from said supported portion toward the other side plate portion of said holder, said engaging projection being inserted into said engagement groove of said recording medium cartridge and engaged with said engaging portion in said engagement groove when said recording medium cartridge is inserted into said holder; and
    a biasing spring for biasing said eject lever in said ejecting direction.

2. The recording medium drive apparatus according to claim 1 wherein,
    when said recording medium cartridge is inserted into said holder, said eject lever is moved in said inserting direction by movement of said recording medium cartridge in said holder, and
    when said eject lever is moved in said ejecting direction by a biasing force of said biasing spring in a condition where said engaging projection is engaged with said engaging portion of said recording medium cartridge, said recording medium cartridge is ejected from said holder.

3. The recording medium drive apparatus according to claim 1 wherein,
    said engaging portion of said recording medium cartridge is formed with an inclined surface displaced in said ejecting direction with a change in position from said one side surface of said case of said recording medium cartridge toward an inside of said case, and said engaging projection of said eject lever is formed with an inclined portion adapted to engage with said inclined surface of said engaging portion of said recording medium cartridge.

4. The recording medium drive apparatus according to claim 1 wherein,
    said one side surface of said case of said recording medium cartridge is formed with an engagement recess, and
    said eject lever is formed with an elastic deforming portion elastically deformable in a direction toward and away from said one side surface of said case and an undue ejection preventing projection projecting from said elastic deforming portion toward said one side surface of said case,
    said undue ejection preventing projection of said eject lever coming into engagement with said engagement recess of said recording medium cartridge when said recording medium cartridge is inserted into said holder.

5. Electronic equipment comprising:
    a housing having a front surface and a rear surface;
    a display provided on said front surface of said housing;
    a lid openably provided on said rear surface of said housing; and
    a recording medium drive apparatus mounted in said housing and adapted to use a recording medium cartridge having a case and a recording medium accommodated in said case, said case having a substantially arcuate circumferential surface and a pair of straight side surfaces respectively contiguous to opposite ends of said arcuate circumferential surface, at least one of said side surfaces being formed with an engagement groove at a position near said arcuate circumferential surface, said engagement groove including an engaging portion; said recording medium drive apparatus comprising:
        a holder pivotably provided in said housing for holding said recording medium cartridge inserted, said holder having a pair of side plate portions respectively extending along said side surfaces of said recording medium cartridge;
        a recording/reproducing system for recording and/or reproducing an information signal on said recording medium;
        a chassis for mounting said recording/reproducing system;
        an eject lever supported to one of said side plate portions of said holder so as to be movable in an inserting direction of said recording medium cartridge into said holder and in an ejecting direction of said recording medium cartridge from said holder opposite to said inserting direction, said eject lever having a supported portion supported to said one side plate portion of said holder and an engaging projection projecting from said supported portion toward the other side plate portion of said holder, said engaging projection being inserted into said engagement groove of said recording medium cartridge and engaged with said engaging portion in said engagement groove when said recording medium cartridge is inserted into said holder; and a biasing spring for biasing said eject lever in said ejecting direction.

* * * * *